United States Patent
Enokido et al.

(12) 
(10) Patent No.: US 7,858,023 B2
(45) Date of Patent: Dec. 28, 2010

(54) METHOD FOR PRODUCING RAW MATERIAL POWDER FOR RARE EARTH SINTERED MAGNET, METHOD FOR PRODUCING RARE EARTH SINTERED MAGNET, GRANULE AND SINTERED BODY

(75) Inventors: Yasushi Enokido, Tokyo (JP); Fumitaka Baba, Tokyo (JP); Chikara Ishizaka, Tokyo (JP); Takeshi Masuda, Tokyo (JP)

(73) Assignee: TDK Corporation, Tokyo (JP)

( * ) Notice: Subject to any disclaimer, the term of this patent is extended or adjusted under 35 U.S.C. 154(b) by 230 days.

(21) Appl. No.: 11/569,767

(22) PCT Filed: Jun. 28, 2005

(86) PCT No.: PCT/JP2005/011787

§ 371 (c)(1),
(2), (4) Date: Nov. 29, 2006

(87) PCT Pub. No.: WO2006/003872

PCT Pub. Date: Jan. 12, 2006

(65) Prior Publication Data

US 2008/0053273 A1  Mar. 6, 2008

(30) Foreign Application Priority Data

| Jun. 30, 2004 | (JP) | 2004-193723 |
| Jun. 30, 2004 | (JP) | 2004-193725 |
| Jun. 30, 2004 | (JP) | 2004-193726 |
| Jun. 30, 2004 | (JP) | 2004-193727 |
| Sep. 28, 2004 | (JP) | 2004-282687 |
| Sep. 29, 2004 | (JP) | 2004-285384 |
| Sep. 29, 2004 | (JP) | 2004-285385 |
| Feb. 28, 2005 | (JP) | 2005-052458 |
| Mar. 24, 2005 | (JP) | 2005-086098 |

(51) Int. Cl.
*B22F 1/00* (2006.01)
*B22F 1/02* (2006.01)
(52) U.S. Cl. .......................................... 419/38; 75/246
(58) Field of Classification Search ................. 148/302; 419/12, 38; 75/246
See application file for complete search history.

(56) References Cited

U.S. PATENT DOCUMENTS

| 6,187,259 B1 * | 2/2001 | Yamashita et al. ............ 419/12 |
| 6,361,738 B1 | 3/2002 | Kaneko et al. |
| 2004/0149354 A1 | 8/2004 | Kuniyoshi et al. |

(Continued)

FOREIGN PATENT DOCUMENTS

CN   1084668 A   3/1994

(Continued)

*Primary Examiner*—George Wyszomierski
*Assistant Examiner*—Weiping Zhu
(74) *Attorney, Agent, or Firm*—Pearne & Gordon LLP

(57) ABSTRACT

A method for producing a rare earth sintered magnet uses granules having an excellent fluidity to improve the dimensional accuracy and production of a compact formed of the granules without significant property losses. The granules are formed by adding an organic liquid to primary alloy particles having a predetermined composition to produce granules having the primary alloy particles adhered together by the organic liquid. Preferably, from 1.5 to 15.0% by weight of the organic liquid is added to the primary alloy particles.

25 Claims, 22 Drawing Sheets

U.S. PATENT DOCUMENTS

2005/0098238 A1 * 5/2005 Morimoto et al. .......... 148/302

FOREIGN PATENT DOCUMENTS

| CN | 1157051 | A |   | 8/1997 |
|----|---------|---|---|--------|
| CN | 1272214 | A |   | 11/2000 |
| CN | 150021 | A |   | 5/2004 |
| JP | 60-175534 | A |   | 9/1985 |
| JP | 62-086099 | A |   | 4/1987 |
| JP | 63-237402 | A |   | 10/1988 |
| JP | 05-070801 | A |   | 3/1993 |
| JP | 07-283058 | A |   | 10/1995 |
| JP | 08-088111 | A |   | 4/1996 |
| JP | 08-107034 | A |   | 4/1996 |
| JP | 08107034 | A | * | 4/1996 |
| JP | 2001-030239 | A |   | 2/2001 |
| JP | 2002-194402 | A |   | 7/2002 |
| JP | 2002-294303 | A |   | 10/2002 |
| JP | 2003-200030 | A |   | 7/2003 |

* cited by examiner

FIG. 3

| Organic liquid | Saturated vapor pressure (mmHg) | Surface tension (dyn/cm) | Viscosity (cps) |
|---|---|---|---|
| butyl CARBITOL™[1] | 0.01 /20°C | 33.6 /25°C | 6.42 /20°C |
| diethylene glycol | 0.01 /20°C | 48.5 /25°C | 38 /20°C |
| butyl CARBITOL acetate™[2] | 0.01 /20°C | 29.9 /25°C | 3.56 /20°C |
| pinene | 5.0 /27°C | 31.4 /20°C | 3.6 /20°C |
| cyclohexanol | 0.8 /20°C | 34.2 /16°C | 49.8 /25°C |
| terpineol | 0.04 /20°C | 35 /25°C | 54.0 /20°C |
| ethylene glycol | 0.05 /20°C | 46.5 /20°C | 26.1 /15°C |
| CARBITOL™[3] | 0.126 /25°C | 35.5 /25°C | 4.3 /20°C |
| menthane | 1.0 /10°C | 31.4 /20°C | 3.6 /20°C |
| butyl CELLOSOLVE™[4] | 0.7 /20°C | 31.5 /25°C | 6.4 /20°C |
| CELLOSOLVE™[5] | 3.8 /20°C | 32 /25°C | 2.1 /20°C |
| xylene | 10 /28.24°C | 30 /20°C | 0.62 /20°C |
| methylisobutylketone | 16 /20°C | 25.4 /25°C | 0.59 /20°C |
| toluene | 30 /20°C | 28.5 /20°C | 0.59 /20°C |
| ethanol | 43.5 /20°C | 22.1 /25°C | 1.22 /20°C |
| n-butyl acetate | 10.0 /20°C | 25.2 /20°C | 0.69 /25°C |
| dibutyl ether | 12.5 /25°C | 22.0 /30°C | 0.60 /30°C |
| methylethylketone | 71.2 /20°C | 24.6 /20°C | 0.42 /15°C |
| ethyl acetate | 74 /20°C | 23.9 /20°C | 0.45 /20°C |
| acetone | 184.8 /20°C | 23.7 /20°C | 0.35 /20°C |
| water | 17.5 /20°C | 72.8 /20°C | 1.02 /20°C |

[1] diethylene glycol monobutyl ether

[2] diethylene glycol monobutyl ether acetate

[3] diethylene glycol monethyl ether

[4] ethylene glycol monobutyl ether

[5] ethylene glycol monoethyl ether

FIG. 4

| | Organic liquid | | | | | Magnetic properties | | | Angle of repose (°) |
|---|---|---|---|---|---|---|---|---|---|
| | Name | Vapor pressure (mmHg) | Surface tension (dyn/cm) | Viscosity (cps) | Added amount (% by weight) | Br (G) | iHc (Oe) | (BH)max (kG) | |
| Example 1 | ethanol | 43.5/20°C | 22.1/25°C | 1.22/20°C | 2 | 12268 | 27524 | 36.20 | 49 |
| Example 2 | toluene | 30.0/26.3°C | 28.5/20°C | 0.59/20°C | 2 | 12380 | 27800 | 36.90 | 49 |
| Example 3 | methylisobutylketone | 16.0/20°C | 24.5/25°C | 0.59/20°C | 2 | 12286 | 27737 | 36.37 | 49 |
| Example 4 | butyl CELLOSOLVE™⁴ | 0.7/20°C | 31.5/25°C | 6.42/20°C | 2 | 12231 | 27966 | 35.88 | 45 |
| Example 5 | CARBITOL™³ | 0.126/25°C | 35.5/25°C | 4.3/20°C | 2 | 12231 | 27966 | 35.96 | 45 |
| Example 6 | butyl CARBITOL™¹ | 0.01/20°C | 33.6/25°C | 6.49/20°C | 2 | 12256 | 27544 | 36.17 | 45 |
| Example 7 | terpineol | 0.04/20°C | 35.0/25°C | 54.0/20°C | 2 | 12313 | 28012 | 36.40 | 44 |
| Example 8 | butyl CARBITOL acetate™² | 0.01/20C | 29.9/20C | 3.56/20C | 2 | 12290 | 27860 | 36.33 | 44 |
| Example 9 | cyclohexanol | 0.8/20C | 34.23/16.2C | 49.8/25C | 2 | 12280 | 27687 | 36.40 | 45 |
| Example 10 | n-butyl acetate | 10.0/20C | 25.2/20C | 0.693/25C | 2 | 12290 | 27674 | 36.35 | 47 |
| Example 11 | dibutyl ether | 12.5/25C | 21.99/30C | 0.602/30C | 2 | 12260 | 27620 | 36.20 | 47 |
| Example 12 | xylene | 10.0/28.24C | 30.0/20C | 0.617/20C | 2 | 12310 | 27900 | 36.50 | 48 |
| Example 13 | cyclohexanone | 5.0/26.4C | 35.12/15C | 2.453/15C | 2 | 12268 | 27660 | 36.30 | 47 |
| Example 14 | propionic anhydride | 1.0/20C | 30.3/20C | 1.14/20C | 2 | 12287 | 28830 | 36.35 | 46 |
| Example 15 | pinene | 5.0/27°C | 31.4/20°C | 3.6/20°C | 2 | 12300 | 28045 | 36.37 | 46 |
| Example 16 | methane | 1.0/10°C | 31.4/20°C | 3.6/20°C | 2 | 12296 | 28060 | 36.35 | 45 |
| Comparative Example 1 | — | | | | | 12438 | 27804 | 37.28 | 60 |
| Comparative Example 2 | binder: polystyrene | | | | 0.5 | 2026 | 298 | 1.24 | 51 |

¹diethylene glycol monobutyl ether
²diethylene glycol monobutyl ether acetate
³diethylene glycol monethyl ether
⁴ethylene glycol monobutyl ether FIG. 5
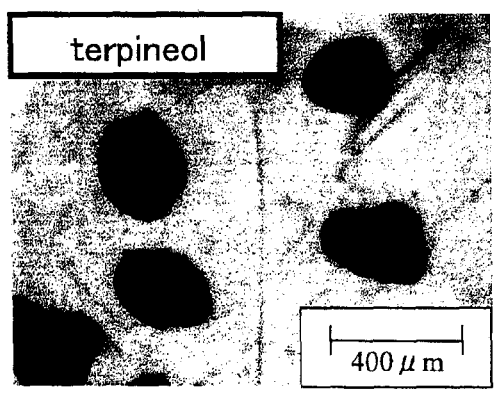
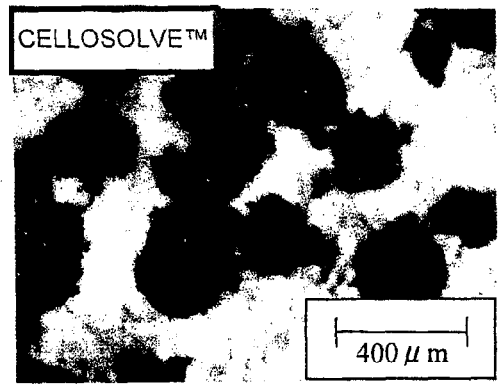
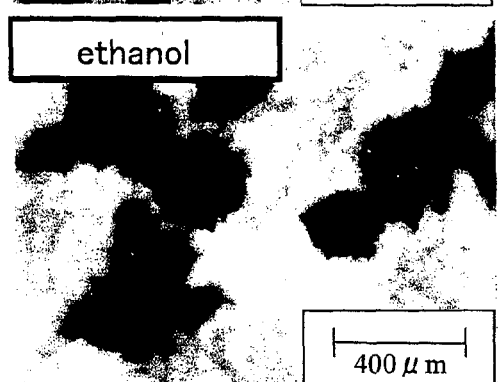
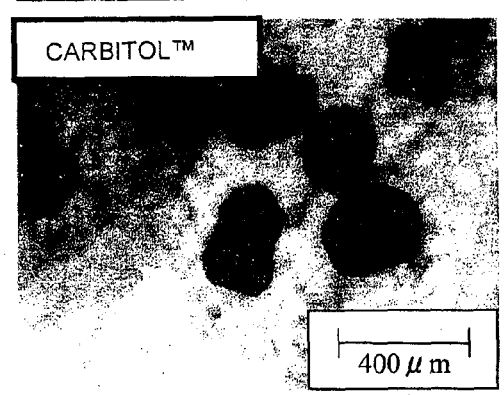
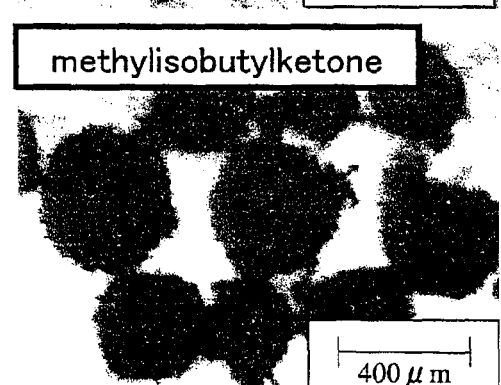
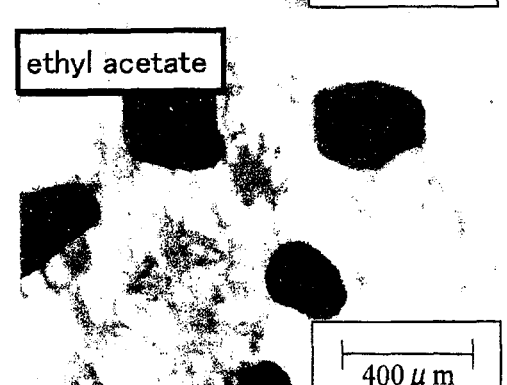
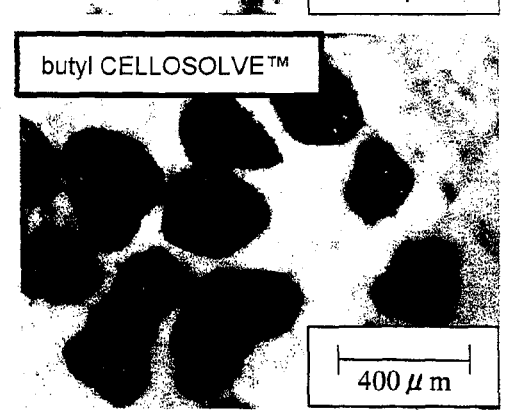
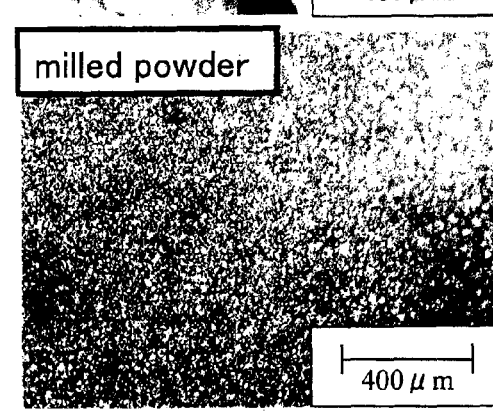

100 μm

100 μm

| Ethanol added amount (% by weight) | Granule production | Compacting condition | Angle of repose (°) | Compacted body strength (MPa) |
|---|---|---|---|---|
| 0 | — | good | 60 | 0.33 |
| 0.5 | poor | good | 52 | 0.38 |
| 1.0 | poor | good | 51 | 0.42 |
| 2.5 | good | good | 45 | 0.58 |
| 3.5 | good | good | 45 | 0.6 |
| 4.5 | good | good | 44 | 0.66 |
| 6.5 | good | good | 45 | 0.68 |
| 9.0 | good | good | 44 | 0.64 |
| 11.0 | good | good | 45 | 0.65 |
| 13.0 | good | moisture removal required | 47 | cracks |

FIG. 9

| | Organic liquid | | | | | | Magnetic properties | | | Angle of repose (°) |
|---|---|---|---|---|---|---|---|---|---|---|
| | Name | Vapor pressure (mmHg) | Surface tension (dyn/cm) | Viscosity (cps) | Remaining amount (% by weight) | Vacuum degree (Torr) | Br (G) | iHc (Oe) | (BH)max (MGOe) | |
| Example 17 | terpineol | 0.04/20°C | 35.0/25°C | 54.0/20°C | 0.1 | $4 \times 10^{-4}$ | 12408 | 26999 | 37.06 | 48 |
| | | | | | 1.1 | $1 \times 10^{-3}$ | 12350 | 27187 | 36.66 | 44 |
| | | | | | 2.7 | $1 \times 10^{-2}$ | 12289 | 27232 | 36.25 | 43 |
| Example 18 | ethanol | 43.5/20°C | 22.1/25°C | 1.22/20°C | 0.1 | $2 \times 10^{-1}$ | 12364 | 26899 | 36.65 | 50 |
| | | | | | 1.3 | $1 \times 10^{0}$ | 12301 | 27020 | 36.34 | 49 |
| | | | | | 2.8 | $4.5 \times 10^{0}$ | 12250 | 27176 | 36.12 | 48 |
| Example 19 | toluene | 30.0/26.3°C | 28.5/20°C | 0.59/20°C | 0.1 | $2 \times 10^{-1}$ | 12400 | 26988 | 36.90 | 49 |
| | | | | | 1.2 | $1 \times 10^{0}$ | 12355 | 27240 | 36.67 | 49 |
| | | | | | 3.0 | $4.5 \times 10^{0}$ | 12280 | 27008 | 36.25 | 48 |
| Example 20 | butyl CARBITOL acetate™[2] | 0.01/20°C | 29.9/20°C | 3.56/20°C | 0.1 | $4 \times 10^{-4}$ | 12379 | 27008 | 36.77 | 48 |
| | | | | | 1.0 | $1 \times 10^{-3}$ | 12345 | 27173 | 36.59 | 46 |
| | | | | | 2.8 | $1 \times 10^{-2}$ | 12290 | 27220 | 36.30 | 44 |
| Example 21 | butyl CELLOSOLVE™[4] | 0.7/20°C | 31.5/25°C | 6.42/20°C | 0.1 | $5 \times 10^{-3}$ | 12370 | 26980 | 36.73 | 48 |
| | | | | | 1.3 | $8 \times 10^{-2}$ | 12332 | 27110 | 36.50 | 45 |
| | | | | | 2.7 | $6 \times 10^{-1}$ | 12269 | 27204 | 36.19 | 45 |
| Example 22 | pinene | 5.0/27°C | 31.6/20°C | 3.6/20°C | 0.1 | $3 \times 10^{-2}$ | 12390 | 27010 | 36.84 | 48 |
| | | | | | 1.1 | $4 \times 10^{-1}$ | 12352 | 27166 | 36.66 | 46 |
| | | | | | 2.7 | $1 \times 10^{0}$ | 12277 | 27230 | 36.21 | 44 |
| Comparative Example 3 | — | | | | | — | 12393 | 27253 | 36.85 | 60 |
| Comparative Example 4 | binder: polystyrene | | | | 0.5 | — | 2026 | 298 | 1.24 | 51 |

[2] diethylene glycol monobutyl ether acetate
[4] ethylene glycol monobutyl ether

FIG. 10

| Terpineol remaining amount (% by weight) | Vacuum degree (Torr) | Temperature | Magnetic properties | | | Angle of repose (°) |
|---|---|---|---|---|---|---|
| | | | Br (G) | iHc (Oe) | (BH)max (MGOe) | |
| 0.06 | $10^{-1}$ | 55°C | 12520 | 26775 | 37.80 | 49 |
| 0.15 | | | 12496 | 26810 | 37.68 | 48 |
| 1.10 | | | 12442 | 26902 | 37.23 | 44 |
| 1.32 | | | 12423 | 26902 | 37.11 | 44 |
| 1.90 | | | 12414 | 26993 | 37.01 | 43 |
| 3.80 | | | 12380 | 26997 | 36.98 | 41 |

FIG. 11

| Ethanol added amount (% by weight) | Granule production | Compacting condition | Angle of repose (°) | Compacted body strength (MPa) |
|---|---|---|---|---|
| 0 | — | good | 60 | 0.33 |
| 0.5 | poor | good | 52 | 0.38 |
| 1.0 | poor | good | 51 | 0.42 |
| 2.5 | good | good | 45 | 0.58 |
| 3.5 | good | good | 45 | 0.60 |
| 4.5 | good | good | 44 | 0.64 |
| 6.5 | good | good | 45 | 0.65 |
| 9.0 | good | good | 44 | 0.66 |
| 11.0 | good | good | 45 | 0.68 |
| 13.0 | good | moisture removal required | 47 | cracks |
| 16.0 | excess moisture | moisture removal required | 51 | cracks |

FIG. 12

| | Organic liquid | | | | | Vacuum degree (Torr) | Magnetic properties | | | Angle of repose (°) |
|---|---|---|---|---|---|---|---|---|---|---|
| | Name | Vapor pressure (mmHg) | Surface tension (dyn/cm) | Viscosity (cps) | Remaining amount (% by weight) | | Br (G) | iHc (Oe) | (BH)max (MG Oe) | |
| Example 23 | terpineol | 0.04/20°C | 35.0/25°C | 54.0/20°C | 0 | $1 \times 10^{-3}$ | 12410 | 26990 | 37.16 | 51 |
| Example 24 | ethanol | 43.5/20°C | 22.1/25°C | 1.22/20°C | 0 | $1 \times 10^{0}$ | 12366 | 26950 | 36.68 | 53 |
| Example 25 | toluene | 30.0/26.3°C | 28.5/20°C | 0.59/20°C | 0 | $1 \times 10^{0}$ | 12403 | 26980 | 36.95 | 52 |
| Example 26 | butyl CARBITOL acetate™[2] | 0.01/20°C | 29.9/20°C | 3.56/20°C | 0 | $1 \times 10^{-3}$ | 12389 | 27000 | 36.83 | 51 |
| Example 27 | butyl CELLOSOLVE™[4] | 0.7/20°C | 31.5/25°C | 6.42/20°C | 0 | $8 \times 10^{-2}$ | 12386 | 26970 | 36.81 | 51 |
| Example 28 | pinene | 5.0/27°C | 31.6/20°C | 3.6/20°C | 0 | $4 \times 10^{-1}$ | 12395 | 27002 | 36.89 | 51 |
| Comparative Example 5 | | | — | | | — | 12393 | 27253 | 36.85 | 60 |
| Comparative Example 6 | binder: polystyrene | | | | 0.5 | — | 2026 | 298 | 1.24 | 51 |

[2] diethylene glycol monobutyl ether acetate

[4] ethylene glycol monobutyl ether

FIG. 13

| Solvent type | Vacuum degree (Torr) | Temperature | Magnetic properties | | | Angle of repose (°) |
| --- | --- | --- | --- | --- | --- | --- |
| | | | Br (G) | iHc (Oe) | (BH)max (MGOe) | |
| xylene | 10⁻¹ | 55°C | 12403 | 26980 | 36.95 | 52 |
| CARBITOL™[3] | | | 12393 | 27001 | 36.80 | 51 |
| methyliso-butylketone | | | 12383 | 27011 | 36.73 | 51 |
| isobutyl alcohol | | | 12370 | 26970 | 36.69 | 52 |

[3] diethylene glycol monethyl ether

| Ethanol added amount (% by weight) | Granule production |
|---|---|
| 0.0 | × |
| 1.0 | × |
| 1.5 | ○ |
| 5.0 | ○ |
| 10.0 | ○ |
| 15.0 | ○ |
| 16.0 | × |

FIG. 16

| Terpineol added amount (% by weight) | Toluene added amount (% by weight) | Reduced pressure atmosphere (Torr) | Angle of repose (°) | Br (G) | iHc (Oe) | (BH)max (MGOe) |
|---|---|---|---|---|---|---|
| 0.5 | 6.5 | 1 | 47 | 12359 | 26942 | 36.77 |
| 1.0 | 6.0 | 1 | 44 | 12344 | 26927 | 36.65 |
| 2.5 | 4.5 | 1 | 43 | 12236 | 27116 | 35.93 |
| - | - | - | 60 | 12393 | 27253 | 36.85 |

FIG. 17

| First organic liquid 2% by weight | Second organic liquid 6% by weight | Reduced pressure atmosphere (Torr) | Angle of repose (°) | Br (G) | iHc (Oe) | (BH)max (MGOe) |
|---|---|---|---|---|---|---|
| CARBITOL™[3] | ethanol | 1 | 45 | 12290 | 26990 | 36.47 |
| butyl CELLOSOLVE™[4] | methylethyl-ketone | 1 | 45 | 12280 | 27012 | 36.42 |
| CELLOSOLVE™[5] | toluene | 1 | 46 | 12270 | 27005 | 36.36 |

[3] diethylene glycol monethyl ether
[4] ethylene glycol monobutyl ether
[5] ethylene glycol monoethyl ether

FIG. 19

| | Granulation method | First organic liquid (terpineol) (% by weight) | Second organic liquid (ethanol) (% by weight) | Solution charged time t1 (s) | Blending time t2 (s) | Main rotor blade rotation speed (rpm) | Auxiliary rotor blade rotation speed (rpm) | Angle of repose (°) | Magnetic properties | | |
|---|---|---|---|---|---|---|---|---|---|---|---|
| | | | | | | | | | Br (G) | iHc (Oe) | (BH)max (MGOe) |
| Example 29 | horizontal type tumbling | 0.125 | 6.75 | 120 | 60 | 27 | 4700 | 45.2 | 12611 | 23637 | 38.86 |
| Example 30 | horizontal type tumbling | 0.25 | 6.75 | 120 | 60 | 27 | 4700 | 45.0 | 12575 | 23827 | 38.66 |
| Example 31 | horizontal type tumbling | 1.0 | 7.75 | 160 | 60 | 27 | 4700 | 45.7 | 12456 | 26520 | 37.17 |
| Example 32 | horizontal type tumbling | 2.0 | 6.75 | 170 | 60 | 27 | 4700 | 46.7 | 12291 | 26948 | 36.12 |
| Example 33 | horizontal type tumbling | 6.0 | 2.75 | 146 | 60 | 27 | 4700 | 44.0 | 12103 | 26956 | 34.92 |
| Example 34 | horizontal type tumbling | 2.0 | 6.75 | 1090 | 60 | 27 | 4700 | 56.3 | 12337 | 26818 | 36.83 |
| Example 35 | horizontal type tumbling | 2.0 | 6.75 | 430 | 60 | 27 | 4700 | 52.8 | 12263 | 27047 | 36.29 |
| Example 36 | horizontal type tumbling | 2.0 | 6.75 | 120 | 60 | 27 | 4700 | 44.3 | 12254 | 26986 | 36.07 |
| Example 37 | horizontal type tumbling | 2.0 | 6.75 | 125 | 60 | 27 | 4700 | 45.0 | 12199 | 27009 | 35.85 |
| Example 38 | horizontal type tumbling | 2.0 | 6.75 | 170 | 60 | 27 | 6080 | 49.2 | 12638 | 23635 | 38.90 |
| Example 39 | vertical type tumbling | 2.0 | 5.00 | 93 | 30 | 360 | 4700 | 51.3 | 12245 | 27001 | 35.06 |
| Example 40 | vertical type tumbling | 2.0 | 6.67 | 90 | 30 | 360 | 1800 | 43.7 | 12190 | 26993 | 35.74 |
| Example 41 | vertical type tumbling | 2.0 | 8.33 | 90 | 30 | 360 | 1800 | 44.3 | 12181 | 26650 | 35.69 |
| Example 42 | vertical type tumbling | 2.0 | 5.00 | 90 | 90 | 360 | 1800 | 52.3 | 12204 | 26994 | 35.88 |
| Example 43 | vertical type tumbling | 2.0 | 6.67 | 90 | 30 | 360 | 3600 | 42.0 | 12190 | 26810 | 35.77 |
| Example 44 | vertical type tumbling | 0.5 | 8.17 | 90 | 30 | 360 | 1800 | 43.3 | 12405 | 26780 | 37.17 |
| Comparative Example 7 | tumbling fluidized bed | 2.0 | 8.00 | — | — | — | — | 58.5 | 12327 | 26958 | 36.42 |
| Comparative Example 8 | tumbling fluidized bed | 6.0 | 4.00 | — | — | — | — | 56.0 | 12103 | 27222 | 34.90 |
| Comparative Example 9 | — | — | — | — | — | — | — | 60.0 | 12645 | 26833 | 38.90 |
| Comparative Example 10 | binder | — | — | — | — | — | — | 51.0 | 2026 | 298 | 1.24 |

FIG. 20
Example 30
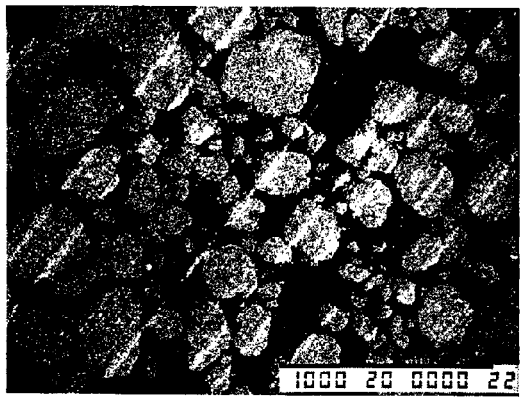
Example 31
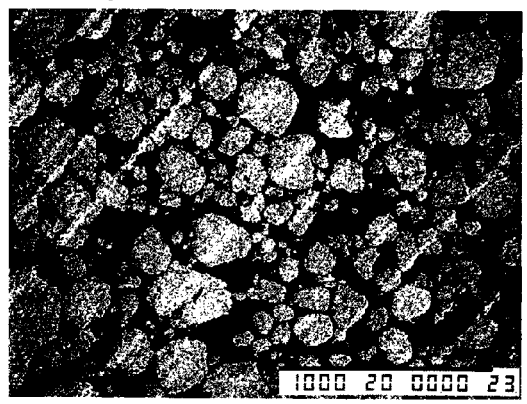
Comparative Example 7
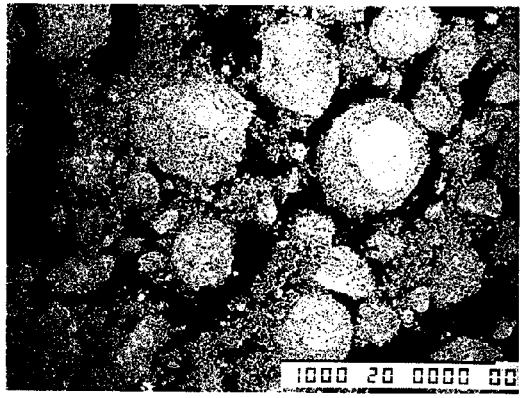
Comparative Example 8
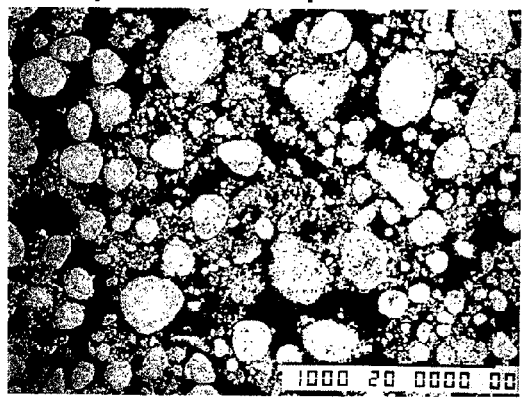
1000μm

FIG. 21

| | Granulation method | Binder concentration (% by weight) | Binder-removal treatment | Angle of repose (°) | Compacted body strength (MPa) | Granule strength (MPa) | Magnetic properties | | |
|---|---|---|---|---|---|---|---|---|---|
| | | | | | | | Br (%) | iHc (Oe) | BH(max) (MGOe) |
| Example 46 | tumbling granulating | 0.02 | no | 46.7 | 0.401 | 0.018 | 99.5 | 26835 | 36.88 |
| Example 47 | tumbling granulating | 0.05 | no | 44.3 | 0.442 | 0.026 | 99.3 | 26839 | 36.72 |
| Comparative Example 11 | extrusion granulating | 0.05 | no | 46.7 | 0.438 | 0.015 | 99.2 | 26820 | 36.68 |
| Comparative Example 12 | tumbling fluidized bed granulating | 0.05 | no | 60.5 | 0.452 | 0.005 | 99.9 | 26757 | 37.1 |
| Comparative Example 13 | tumbling fluidized bed granulating | 0.05 | yes | 60.5 | 0.452 | 0.005 | 99.3 | 27303 | 36.64 |
| Comparative Example 14 | spray drying | 0.05 | yes | 56.8 | 0.448 | 0.021 | 96.44 | 27840 | 34.98 |
| Comparative Example 15 | spray drying | 0.1 | yes | 56.8 | 0.502 | 0.035 | 95.43 | 27656 | 33.64 |
| Comparative Example 16 | — | 0 | no | 60 | 0.38 | — | 100 | 26833 | 36.97 |

Example 47

1000 μm

Comparative Example 11

1000 μm

Comparative Example 12

1000 μm

Comparative Example 14

100 μm

FIG. 25
Example 49
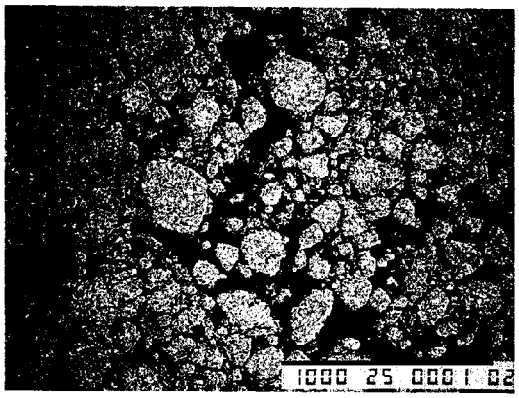
Example 50
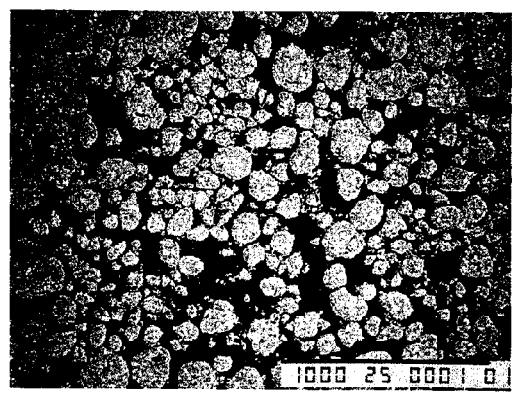
1000μm
Comparative Example 17

FIG. 26

| | Angle of repose (°) | σ/ave. (%) | Br (G) |
|---|---|---|---|
| Original material | 60.0 | 2.40 | 12698 |
| Comparative Example 18 | 46.7 | 0.45 | 12601 |
| Example 51 | 45.5 | 0.43 | 12603 |
| Example 52 | 43.1 | 0.39 | 12615 |
| Example 53 | 41.5 | 0.31 | 12630 |

METHOD FOR PRODUCING RAW MATERIAL POWDER FOR RARE EARTH SINTERED MAGNET, METHOD FOR PRODUCING RARE EARTH SINTERED MAGNET, GRANULE AND SINTERED BODY

TECHNICAL FIELD

The present invention relates to a raw material powder used in the production of a rare earth sintered magnet as represented by an Nd—Fe—B system, and especially relates to a technique which not only achieves a high level of productivity by granulation of the raw material powder, thereby improving filling properties into a die during compacting in a magnetic field, but also easily handles the miniaturization of rare earth sintered magnets.

BACKGROUND ART

When producing a rare earth sintered magnet, magnetic properties such as saturation flux density and coercive force are secured by making finer the raw material powder subjected to sintering. However, making the raw material powder finer is a factor in hindering the dimensional accuracy of the compacted body and productivity.

The raw material powder constitutes the compacted body undergoing compressing in a magnetic field. In this compacting in a magnetic field, a magnetostatic field or a pulsed magnetic field is applied, whereby the particles of the raw material powder are oriented. During the compacting in a magnetic field, the finer the raw material powder is, the worse the fluidity of the powder is, so that the filling properties into the die become a problem. If the filling properties into the die worsen, since the powder cannot be sufficiently filled into the die, there are the problems that dimensional accuracy of the compacted body cannot be achieved, or that the filling into the die itself takes time, thus hindering productivity. It is especially difficult to produce thin-shaped or complex-shaped compacts precisely and efficiently.

As one means for improving the fluidity of a raw material powder, granulation of the raw material powder has been experimented with. For example, Japanese Patent Laid-Open No. 8-107034 (Patent Document 1) and Japanese Patent Laid-Open No. 8-88111 (Patent Document 2) propose granulation by adding a binder to a rare earth metal powder, and then spray drying the resulting slurry. Further, Japanese Patent Publication No. 7-6025 (Patent Document 3) proposes granulation by applying a magnetic field to a rare earth metal powder. Other proposals include a technique wherein granulation is performed by creating a flow (air flow) of a fluid in a chamber to thereby apply the kinetic energy from the flow to the raw material powder in the chamber (Patent Document 4).

Patent Document 1: Japanese Patent Laid-Open No. 8-107034

Patent Document 2: Japanese Patent Laid-Open No. 8-88111

Patent Document 3: Japanese Patent Publication No. 7-6025

Patent Document 4: Japanese Patent Laid-Open No. 2004-131815

DISCLOSURE OF THE INVENTION

According to Patent Documents 1 and 2, fluidity can be improved by producing granules. However, because the primary alloy particles are adhered together by a binder, such as PVA (polyvinyl alcohol) for instance, the adhesion force among the primary alloy particles is comparatively strong. Even if granules with such strong adhesion force are subjected to compacting in a magnetic field, it is not easy to orient the respective primary alloy particles. Therefore, the obtained rare earth sintered magnet has low orientation, and thus its magnetic properties, especially residual flux density (Br), are low. In addition, since the carbon contained in the binder becomes a factor in lowering magnetic properties, a step of removing the binder is necessary.

According to Patent Document 3, a step of applying an alternating current magnetic field is required in order to improve magnetic properties after the step of compacting in a magnetic field during the fabrication of a compressed body and after filling the granules into the die. Further, since the granules have been subjected to a magnetic field, there is the concern of a drop in fluidity as a result of residual magnetization.

Even in a method which forms granules by the flow of a fluid in a chamber, such as the technique disclosed in Patent Document 4, the raw material powder (granules) repeatedly rises and falls in the chamber from the flow, and thus repeatedly collides with the chamber walls or with other granules. The granules disintegrate from these collisions, or in other words, the problem arises that the granule yield is reduced.

The present invention was created in view of such technical problems. It is an object of the present invention to provide a method for producing a rare earth sintered magnet which cannot only improve the dimensional accuracy of a compact and improve productivity, but does not substantially reduce the properties thereof using granules having high fluidity.

As described above, in granulation techniques employing a conventional binder, a slurry is prepared which contains a fixed amount of a so-called organic solvent as a solvent for dissolving the binder and as a dispersion medium for dispersing the primary alloy particles. The present inventors have focused on this organic solvent, whereby as a result, granules can be produced using an organic solvent alone, and these granules have excellent fluidity when being filled into a die. In addition, since these granules, which are produced only with an organic solvent, have a relatively weak adhesion force among the primary alloy particles, the granules separate into primary alloy particles by the magnetic field which is applied during the compacting in a magnetic field, whereby it has been confirmed that a good orientation state can be realized. Accordingly, the present invention is a method for producing a raw material powder for a rare earth sintered magnet, characterized by comprising the steps of: obtaining a mixture by adding an organic liquid to primary alloy particles having a predetermined composition; and producing granules having the primary alloy particles adhered together by the organic liquid from the mixture.

In the present invention, it is preferable to add from 1.5 to 15.0% by weight of the organic liquid to the primary alloy particles. This is because if the amount is no more than 1.5% by weight, in some cases it is difficult to efficiently produce the granules, while if more than 15.0% by weight, moisture is excessive, whereby it is sometimes necessary to remove the unnecessary moisture in order to carry out suitable compacting in a magnetic field.

In the present invention, the organic liquid preferably comprises the properties of a saturated vapor pressure at 20° C. of no greater than 75 mmHg (10.0 kPa), a surface tension at 20° C. of 20 dyn/cm or more, and a viscosity at 20° C. of 0.35 cp or more. To maintain the shape of the produced granules, it is preferable to have these physical properties. Preferably, examples of the organic liquid in the present invention include ethanol, toluene, CARBITOL™ (diethylene glycol monoethyl ether), terpene compounds, butyl CARBITOL™ (diethylene glycol monobutyl ether), butyl CARBITOL™ acetate (diethylene glycol monobutyl ether acetate), n-butyl acetate, butyl CELLOSOLVE™ (ethylene glycol monobutyl ether) and cyclohexanol. More preferable are butyl CELLOSOLVE™ (ethylene glycol monobutyl ether), butyl CARBITOL™ (diethylene glycol monobutyl ether), terpineol and pinene.

When the present inventors further produced granules with only an organic liquid, they learned that the amount of the organic liquid required as moisture for producing the granules differs from the amount of organic liquid required for the granules to maintain their shape, and that the latter needs a smaller amount. The impact that the organic liquid has on magnetic properties can be said to be extremely small as compared with a conventional binder, such as PVA. However, it was ascertained that the amount of organic liquid when the granules have been formed had an effect on the magnetic properties of a rare earth sintered magnet.

If the organic liquid is added only in the amount required for providing the necessary moisture for granule formation, magnetic properties will still be harmed to some extent. Of course, by providing a step of removing the organic liquid at any stage after granule formation, the problem concerning magnetic properties can be resolved. However, from the perspective of production costs, it is desirable for this organic liquid removal step to be simple. So that this requirement can be fulfilled, it was discovered that after producing the granules using an organic liquid, to achieve the object of the present invention it is effective to leave the amount required for maintaining the shape of the granules and remove the rest of the organic liquid. In other words, if the granules are produced using an organic liquid which is easy to remove after granule formation and an organic liquid which is more difficult to remove than such organic liquid, it is possible to then preferentially remove from the granules only the easily-removable organic liquid, and let the difficult-to-remove organic liquid remain in the granules.

The present invention was created based on the above knowledge, whereby a mixture can be obtained by adding to primary alloy particles having a predetermined composition a first organic liquid and a liquid component which has a higher saturated vapor pressure than the first organic liquid.

Since this method for producing a raw material powder for a rare earth sintered magnet produces granules by using a first organic liquid and a liquid component which has a higher saturated vapor pressure than the first organic liquid, by exposing the granules to a given reduced pressure atmosphere or heat (including heating under a reduced pressure), it is possible to preferentially remove from the granules the liquid component over the first organic liquid. In addition, by selecting the saturated vapor pressure of the liquid component, not only can the liquid component be easily removed at a low reduced pressure atmosphere, but the first organic liquid can be allowed to remain in the granules.

Here, while the liquid component may be a solution such as water or similar, to prevent oxidation of the primary alloy particles, it is preferable for the liquid component in the present invention to be an organic liquid (a second organic liquid). In such case, it is preferable for no greater than 6.0% by weight (not including zero) of the first organic liquid and no greater than 15.0% by weight (not including zero) of the second organic liquid to be added into the primary alloy particles. The first organic liquid should be present in an amount that is sufficient to maintain the primary alloy particles in a granule shape, while the second organic liquid is present to secure the moisture for granule production. As described above, to remove the second organic liquid from granules which are constituted from a first organic liquid and a second organic liquid, the subject granules may be exposed to a reduced pressure atmosphere or heat (including heating under a reduced pressure). The degree of reduced pressure may be set as appropriate according to the specific compositions which constitute the first organic liquid and second organic liquid being used.

It is an ultimate object of the present invention to obtain a rare earth sintered magnet. Therefore, provided is a method for producing a rare earth sintered magnet characterized by comprising the steps of: charging granules having the primary alloy particles having a predetermined composition adhered together by an organic liquid into a die cavity; obtaining a compact by applying a magnetic field to the granules and compressing the granules; and sintering the compacted body. The organic liquid preferably comprises the amounts and physical properties described above.

To achieve rapid charging into the die cavity, the granules according to the present invention preferably have an angle of repose of 53° or less.

The present invention is also preferably applied to primary alloy particles which comprise a composition containing an $R_2T_{14}B$ phase (wherein R is one or more elements selected from the group consisting of rare earth elements (rare earth elements being a concept which includes Y (yttrium)), and T is one or more elements selected from the group consisting of transition metal elements including Fe or Fe and Co, and whose mean particle size is between 2.5 and 6 µm.

In the present invention, once granules are produced using an organic liquid, the organic liquid can then be removed. Such removal may involve either part of the organic liquid being removed or all of the organic liquid being removed. Removal of the organic liquid is effective in improving the magnetic properties of the subsequently obtained rare earth sintered magnet. The method for removing the organic liquid may be carried out as described above.

In the method for producing a rare earth sintered magnet, granules are produced using a first organic liquid and a second organic liquid which has a higher saturated vapor pressure than the first organic liquid, wherein the granules can be charged into the die cavity after the second organic liquid has been removed from the granules. Here, the second organic liquid has a higher saturated vapor pressure than the first organic liquid. Therefore, in the above-described removal treatment, the second organic liquid preferentially volatilizes over the first organic liquid. This removal treatment preferably exposes the granules to a reduced pressure atmosphere.

In the present invention, the size distribution of the granules can be adjusted by subjecting already produced granules to a vibrating body, and then charged into the die cavity. This vibrating body is preferably a vibrating sieve.

The method for producing the granules according to the present invention is not especially limited, and predetermined kinds of tumbling granulation method can be employed. That is, a raw material powder for a rare earth sintered magnet (primary alloy particles) and a granulation aid are charged into a chamber, whereby the raw material powder is agglomerated through contact with the granulation aid by rotating a main blade provided in the chamber relative to the chamber. The resulting agglomerate is loosened by an auxiliary blade provided in the chamber to produce the granules. Once the produced granules have been charged into a die cavity, a compact is obtained by applying a magnetic field to the granules and compressing the granules. The compact is then sintered, to thereby produce a rare earth sintered magnet.

Thus, by rotating the main blade relative to the chamber, the raw material powder and the granulation aid agglomerate. By then loosening the resulting agglomerate with an auxiliary blade to produce granules, the granules are produced in a good manner without colliding at high speed with the chamber or with other agglomerate.

The above-described granulation aid may be any substance which aids (promotes) granulation of the raw material powder.

However, while fluidity improves if granulation of the raw material powder is carried out, due to the binding force between the raw material powder particles which constitute the granules, the raw material powder finds it more difficult to become oriented in the magnetic field, thus giving rise to the problem that magnetic properties (especially residual flux density (Br)) are deteriorated. For this reason, it is preferable for the granules to be constituted by a weak binding force such that the bonds are easily broken by the application of a magnetic field during magnetic field orientation.

Accordingly, the granulation aid used in the method for producing a rare earth sintered magnet according to the present invention is preferably an organic liquid, water or the like, which comprises the properties of a saturated vapor pressure at 20° C. of no greater than 75 mmHg (10.0 kPa), a surface tension at 20° C. of 20 dyn/cm or more, and a viscosity at 20° C. of 0.35 cp or more.

If an organic liquid, water or the like is used for the granulation aid, there is a difference in the amount of granulation aid required as moisture for producing the granules and the amount of granulation aid required for the granules to maintain their shape. As described above, this latter amount is smaller. While it can be said that the granulation aid of the present invention has a much smaller effect on magnetic properties than that of a conventional binder such as PVA or the like, it was ascertained that the amount of granulation aid when the granules have been formed does have an effect on the magnetic properties of a rare earth sintered magnet. Thus, once the granules have been produced, it is preferable to remove some of the granulation aid. In addition, if the granules can be maintained by the van der Waals forces among the raw material powder, the granulation aid may be completely removed.

As described above, by providing a step of removing a part or all of the granulation aid at any stage after granule formation, the problem concerning magnetic properties can be resolved. However, from the perspective of production costs it is desirable for this granulation aid removal step to be simple. So that this requirement can be fulfilled, it was discovered that, after producing the granules, leaving the amount required for maintaining the shape of the granules and removing the rest of the granulation aid would be effective in achieving the object of the present invention. In other words, if the granules are produced using a liquid component which is easy to remove after granule formation and a first organic liquid which is more difficult to remove than this liquid component, it is possible to preferentially remove from the granules only the easily-removable liquid component, and let the difficult-to-remove first organic liquid remain. This is, namely, to use as the granulation aid a first organic liquid and a liquid component which has a higher saturated vapor pressure than the first organic liquid. While water or the like can be used as the liquid component, an organic liquid (second organic liquid) which has a higher saturated vapor pressure than the first organic liquid can also be used.

Further, in the present invention the granules may comprise only an organic liquid, but also a small amount of an organic binder. That is, the present invention may comprise as the granulation aid a binder solution wherein a small amount of a binder material is dissolved in the organic liquid (organic solvent). A raw material powder for a rare earth sintered magnet and a binder solution are charged into a chamber, whereby the raw material powder is agglomerated through contact with the binder solution by rotating a main blade provided in the chamber relative to the chamber. The resulting agglomerate is loosened by an auxiliary blade provided in the chamber to produce granules. Once the produced granules have been charged into a die cavity, a compact is obtained by applying a magnetic field to the granules and pressing the granules. The compact is then sintered, to thereby produce a rare earth sintered magnet.

Thus, by rotating the main blade relative to the chamber, the raw material powder and the granulation aid agglomerate. By then loosening the resulting agglomerate with an auxiliary blade to produce granules, granules are produced in a good manner without colliding at high speed with the chamber or with other agglomerate. The granules can thus be formed without using much binder.

In the case of granulating a ceramic, etc. PVA (polyvinyl alcohol) is widely used as an organic binder. Even in the present invention, it is possible to use polyvinyl alcohol as the organic binder. A reason for polyvinyl alcohol being widely used is that it does not have a negative impact on electromagnetic properties due to its high binder removal properties from heat treatment, and the fact that it can be easily burned off.

Further, polyvinyl butyral (PVB), as well as dissolving in alcohol, also does not have a negative impact on electromagnetic properties, because of, the same as polyvinyl alcohol, its high binder removal properties from heat treatment, and the fact that it can be easily burned off. The above-described problem can also be resolved by using a binder solution in which polyvinyl butyral is dissolved in alcohol. Based on this fact, in the method for producing a rare earth sintered magnet according to the present invention, it is more preferable to use polyvinyl butyral as the organic binder material, and use an alcohol as the solvent.

In the step of producing the granules, the amount of polyvinyl butyral or polyvinyl alcohol in the binder solution is preferably no greater than 0.20% by weight with respect to the amount of raw material powder. Since the carbon contained in the binder is a factor lowering magnetic properties, a step for removing this binder is usually necessary. However, by suppressing the amount of polyvinyl butyral or polyvinyl alcohol to the amount described above, the carbon content can be at a level which can be ignored from an overall perspective, and thus the binder removal treatment can be omitted. Nevertheless, even if such a small amount of polyvinyl butyral or polyvinyl alcohol is used as the organic binder, according to the techniques of the present invention, granules having high strength can be produced.

In addition, in the step of producing the granules, it is preferable to charge the raw material powder into the chamber, rotate the main blade for a fixed time, and then charge the binder solution into the chamber. As a result, the raw material powder charged into the chamber can be loosened, and if the chamber is purged with an inert gas, air or the like which is present in interparticle voids in the raw material powder can be effectively driven out, whereby the granules can be produced uniformly and efficiently.

The granules according to the present invention produced as described above are characterized in that the granule is formed from a plurality of particles which are adhered together by an organic liquid. Although the substances, and uses thereof, for such granules, and particles which form the granules, are not especially limited, the present invention is suitable for powder metallurgy. In the method for producing a rare earth sintered magnet, it is particularly effective to adhere alloy particles having a predetermined composition which are to serve as a rare earth sintered magnet raw material with an organic liquid and then granulate. The present invention is also preferably applied to alloy particles having a composition which comprises an $R_2T_{14}B$ phase (wherein R is one or more elements selected from the group consisting of rare earth elements (rare earth elements being a concept which includes Y (yttrium), and T is one or more elements selected from the group consisting of transition metal elements including Fe or Fe and Co), and whose mean particle size is between 2.5 and 6 μm.

In such granules, the organic liquid is at least interposed in the contact sites of a plurality of particles. In other words, in the granule state, the organic liquid does not evaporate, and is interposed still in a liquid state, whereby the granules are maintained in a wet state.

In the present invention, the organic liquid is preferably one or two kinds selected from hydrocarbon compounds, alcohol compounds, ether compounds, ester compounds, ketone compounds, fatty acid compounds and terpene compounds.

In the granule state, the organic liquid is interposed still in a liquid state. To maintain the shape of the produced granules, the organic liquid preferably comprises physical properties of a saturated vapor pressure at 20° C. of no greater than 75 mmHg (10.0 kPa), a surface tension at 20° C. of 20 dyn/cm² or more, a viscosity at 20° C. of 20 cp or more, and a boiling point of 50° C. or more which does not vaporize at room temperature.

Further, to prevent oxidation of the milled powder particles, it is preferable to use an organic liquid which has a low oxygen concentration, and whose solubility in water (water solubility) is low.

The present invention can also include a sintered body formed using granules as described above.

Specifically, such a sintered body can be characterized in that it is obtained by adhering a plurality of particles together with an organic liquid to form granules, compressing the granules in a die while applying a magnetic field and then sintering the resulting compacted body.

According to the present invention, granules are used whose primary alloy particles are adhered together by an organic liquid. The adhesion force from the organic liquid is extremely weak. Therefore, a raw material powder for a rare earth sintered magnet obtained according to the present invention is easily disintegrated by a magnetic field applied during compacting in a magnetic field, and is thereby separated into primary alloy particles. As a result, a high degree of orientation can be attained. In addition, at the stage of charging into a die cavity, since the substance is in granule form, not only does this contribute to improving productivity, but this is also effective in improving dimensional accuracy of the compacted body. Furthermore, since the organic liquid can be easily removed, the properties of the rare earth sintered magnet do not dramatically drop.

BRIEF DESCRIPTION OF THE DRAWINGS

FIG. 1 is a series of views illustrating the configuration of a vertical type tumbling system granulating machine, wherein

FIG. 2 is a series of views illustrating the configuration of a horizontal type tumbling system granulating machine, wherein

FIG. 3 is a table illustrating the physical properties of organic liquids;

FIG. 4 is a table illustrating the organic liquids used in the First Working Example, and the magnetic properties of the obtained rare earth sintered magnets;

FIG. 5 is an SEM image of the exterior of the granules produced in the First Working Example;

FIG. 9 is a table illustrating the organic liquids used in the Second Working Example, and the magnetic properties of the obtained rare earth sintered magnets;

FIG. 10 is a table illustrating the residual amount of the organic liquid used in the Second Working Example, and the magnetic properties of the obtained rare earth magnets;

FIG. 11 is a table illustrating the observations and measured results according to the added amount of organic liquid in the Second Working Example;

FIG. 12 is a table illustrating the organic liquids used in the Third Working Example, and the magnetic properties of the obtained rare earth sintered magnets;

FIG. 13 is a table illustrating the other organic liquids used in the Third Working Example, and the magnetic properties of the obtained rare earth sintered magnets;

FIG. 16 is a table illustrating the organic liquids used in the Fourth Working Example, and the magnetic properties of the obtained rare earth sintered magnets;

FIG. 17 is a table illustrating the other organic liquids used in the Fourth Working Example, and the magnetic properties of the obtained rare earth sintered magnets;

FIG. 19 is a table illustrating the organic liquids used in the Fifth Working Example, and the magnetic properties of the obtained rare earth sintered magnets;

FIG. 20 is an SEM image illustrating the cross section of the granules produced in the Fifth Working Example;

FIG. 21 is a table illustrating the organic liquids used in the Sixth Working Example, and the magnetic properties of the obtained rare earth sintered magnets;

FIG. 25 is an SEM image illustrating the cross section of the granules produced in the Seventh Working Example; and FIG. 26 is a table illustrating the organic liquids used in the Seventh Working Example, and the magnetic properties of the obtained rare earth sintered magnets.

Figure 1A:
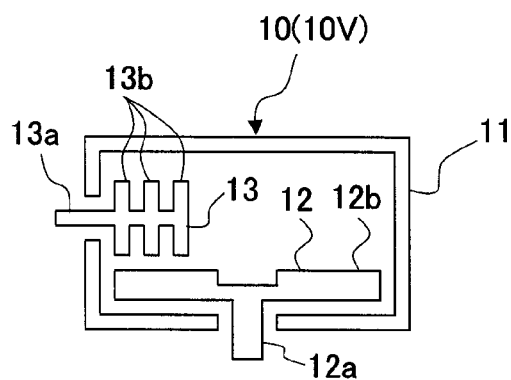
FIG. 1A is a frontal cross-section.

DESCRIPTION OF SYMBOLS 10, 10H, 10V . . . Granulating machine (granule production machine)
11 . . . Chamber
12 . . . Main rotor blade (main blade, tumbling blade)
13 . . . Auxiliary rotor blade (auxiliary blade)

BEST MODE FOR CARRYING OUT THE INVENTION

The present invention will now be described in more detail with reference to embodiments of the present invention.

The present invention forms granules by adhering powder particles together with an organic liquid. Since the organic liquid is present between the particles, liquid crosslinking occurs, whereby primary alloy particles are adhered together. The adhesion force resulting from this organic liquid is extremely weak when compared with the adhesion force resulting from a conventional binder, such as PVA or the like. Therefore, a raw material powder for a rare earth sintered magnet obtained according to the present invention easily disintegrates by the magnetic field applied during compacting in a magnetic field, and is thereby separated into primary alloy particles. For this reason, a high degree of orientation can be attained. Until now, the use of PVA or similar binder has been thought of as a given in granule production, and therefore the finding that granules having high fluidity can be obtained even if, as in the present invention, an organic liquid is used is important. Additionally, because these granules disintegrate from magnetic field application, such granules are suitable for a rare earth sintered magnet which is to undergo compacting in a magnetic field. Nevertheless, compared with a resin such as PVA which is a conventional binder, an organic liquid is extremely easy to remove from a compacted body, and it is possible to omit the binder removal step, which was essential when using conventional granule technology. Thus, the present invention also comprises advantages in terms of its steps.

A method for producing a rare earth sintered magnet which applies granulation technology using the above organic liquid will now be described.

The raw material alloy can be produced by strip casting or some other well-known dissolution process in a vacuum or an inert gas atmosphere, preferably an Ar atmosphere. In strip casting, a raw material metal is dissolved in a non-oxidative atmosphere, such as an Ar gas atmosphere, and the resulting molten metal is squirted onto the surface of a rotating roll. The molten metal is quenched and solidified into a thin sheet or thin flakes (scales) by the roll. This rapidly quenched and solidified alloy possesses a uniform microstructure whose grain size is between 1 and 50 μm. The raw material alloy is not limited to being produced by strip casting, and can be obtained by dissolution processes such as high-frequency induction dissolution or the like. To prevent post-dissolution segregation, the resulting molten metal can be solidified by, for example, pouring at an incline onto a water-cooled copper plate. In addition, an alloy obtained by a reduction diffusion process can also be used as the raw material alloy.

In the case of obtaining an R-T-B system sintered magnet, a so-called mixing process can be used, which uses an alloy (low R alloy) whose main constituent is $R_2T_{14}B$ grains and an alloy (high R alloy) which comprises a larger amount of R than the low R alloy.

The raw material alloy is subjected to a pulverizing step. When employing a mixing process, the low R alloy and high R alloy may be pulverized separately or together. This step comprises a pulverizing step and a milling step. First, a raw material alloy is pulverized to a particle size of approximately several hundreds of μm. The pulverizing is preferably carried out in an inert gas atmosphere, using a stamp mill, a jaw crusher, a Brown mill or the like. Prior to the pulverizing, it is effective to carry out pulverizing by occluding hydrogen into the raw material alloy and then letting the hydrogen be released from the raw material alloy. This hydrogen release treatment is conducted for the purpose of decreasing the amount of hydrogen which is an impurity in rare earth sintered magnets. The heating temperature for the hydrogen release treatment is 200° C. or more, and preferably 350° C. or more. While the retaining time varies depending on the relationship with the retaining temperature, the thickness of the raw material alloy and the like, it is at least for 30 minutes, and preferably for at least 1 hour. The hydrogen release treatment is conducted in a vacuum or under an Ar gas flow. It is noted that the hydrogen occlusion treatment and the hydrogen release treatment are not essential. Mechanical pulverizing may be omitted by conducting this hydrogen-assisted pulverizing alone.

After the pulverizing step, the operation moves on to the milling step. A jet mill is mainly used in the milling, wherein pulverized powder with a particle size of approximately several hundreds of μm is milled to a mean particle size of from 2.5 to 6 μm, and preferably from 3 to 5 μm. The jet mill generates a high-speed gas flow by releasing a high-pressure inert gas from a narrow nozzle. The pulverized powder is accelerated by this high-speed gas flow, causing pulverized powder particles to collide with each other, a target, or the container wall, whereby the powder is milled.

In the case of using a mixing process, the timing for mixing the two kinds of alloy is not limited. However, if the low R alloy and the high R alloy are milled separately in the milling process, the milled low R alloy powder and high R alloy powder are mixed in a nitrogen atmosphere. The mixing ratio of the low R alloy powder and the high R alloy powder may be set approximately between 80:20 and 97:3 by weight ratio. The mixing ratio for when the low R alloy is milled together with the high R alloy is the same. During the milling, from about 0.01 to 0.3% by weight of a fatty acid, fatty acid derivative or hydrocarbon, for example, stearic acid-based or oleic acid-based zinc stearate, calcium stearate, aluminum stearate, stearate acid amide, oleic acid amide, or ethylene bisisostearate acid amide, paraffin or naphthalene as hydrocarbon or the like, may be added in order to improve lubrication and orientation during compacting.

The milled powder obtained above is granulated to produce granules.

As the method for producing granules using the milled powder and an organic liquid, conventional, well-known granulating methods may be adopted. Examples of granulating methods which can be used include a tumbling granulating method, a vibrating granulating method, a mixing granulation method, a flow granulation method, a crushing granulation method, a compression granulation method, an extrusion granulation method and a spray granulation method. Depending on the granulation method, the milled powder and the organic liquid may be mixed and kneaded prior to the chosen method being applied, or may be mixed and kneaded during the chosen method being applied.

Figure 1B:
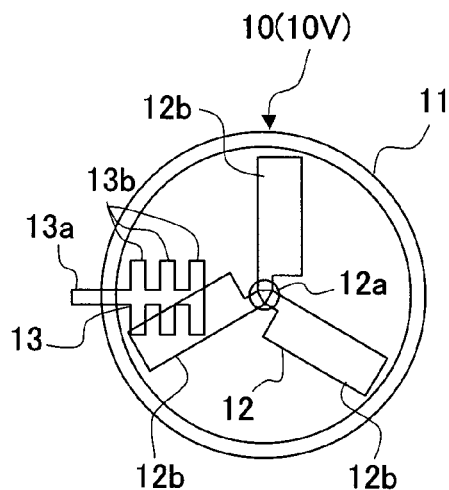
FIG. 1B is a plan view and FIG. 1C is a right side view of FIG. 1B.
Figure 1C:
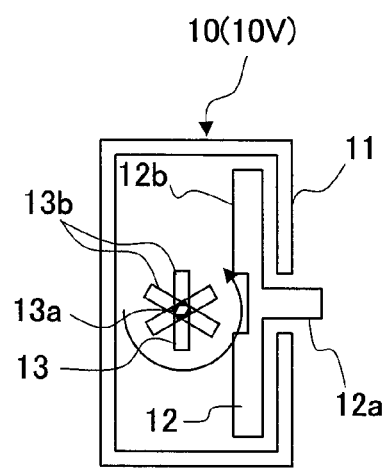
Figure 2A:
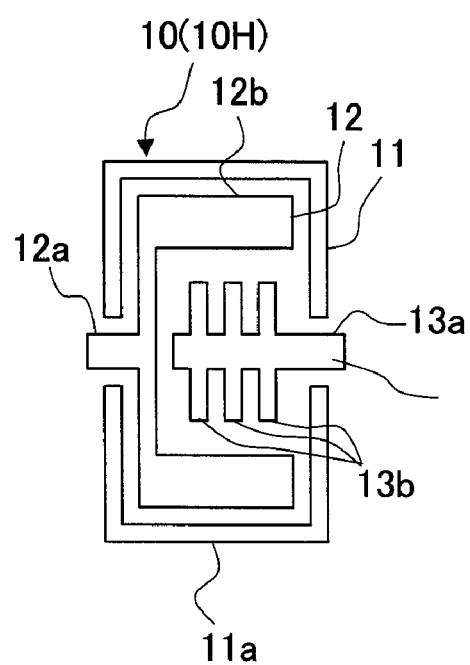
FIG. 2A is a frontal cross-section.
Figure 2B:
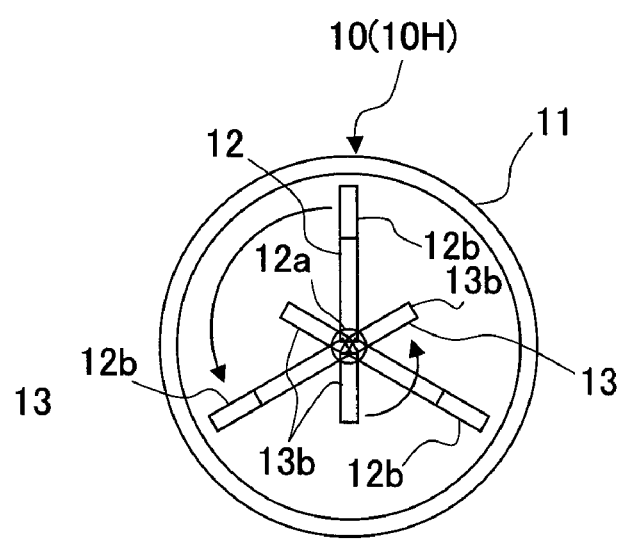
FIG. 2B is a right side view of FIG. 2A.

In the present invention, it is preferable to obtain the granules by tumbling (i.e. applying a motion so that each of the raw material powder grains tumbles around) the milled powder using a granulating machine 10 such as that illustrated in FIG. 1 or 2.

As illustrated in FIGS. 1 and 2, the granulating machine 10 comprises a main blade 12 and an auxiliary blade 13 in a chamber 11.

The chamber 11 comprises a lid (not shown) which is capable of opening and shutting, whereby the chamber becomes tightly sealed when the lid is shut. The chamber 11 further comprises a fluid spray nozzle (not shown) and a dropping nozzle (not shown), from which the organic liquid can be added.

The main blade 12 is provided with a plurality of blade elements 12b on a rotor shaft 12a, and is rotationally driven by a drive motor (not shown) around the shaft line of the rotor shaft 12a. Similarly, the auxiliary blade 13 is also provided with a plurality of blade elements 13b on a rotor shaft 13a, and is rotationally driven around the shaft line of the rotor shaft 13a by a drive motor (not shown), or by the driving force transmitted by a driving force transmission mechanism, such as a gear or a timing belt, from the drive motor for rotating the main blade 12 rotating.

Depending on the positioning of the main blade 12, such a granulating machine 10 can be a vertical type as illustrated in FIG. 1, or a horizontal type as illustrated in FIG. 2.

In the vertical type granulating machine 10V illustrated in FIG. 1, the main blade 12 is provided so that the rotor shaft 12a has a shaft line in a roughly vertical direction in the chamber 11. Further, the auxiliary blade 13 is provided above the main blade 12, such that the rotor shaft 13a has a shaft line in a roughly horizontal direction in the chamber 11.

In the horizontal type granulating machine 10H illustrated in FIG. 2, the main blade 12 is provided so that the rotor shaft 12a has a shaft line in a roughly horizontal direction in the chamber 11. The blade elements 12b of the main blade 12 extend along a peripheral wall 11a which is continuous in a circumferential direction of the chamber 11. The auxiliary blade 13 is provided so as to be positioned inwards of these blade elements 12b.

In such a granulating machine 10V, 10H, the milled powder obtained from steps such as those described above and the organic liquid are both charged in a fixed amount into the chamber 11. Granules are formed by rotating the main blade 12 and the auxiliary blade 13. At this stage, by causing the milled powder and organic liquid to tumble around in the chamber 11 with the main blade 12, the milled powder agglomerates through contact with the organic liquid, to thereby form agglomerate. By loosening the agglomerate with the rotatable auxiliary blade 13, granules are produced in a good manner without colliding at high speed with the chamber 11 or other agglomerate.

In the granulating machine 10V, 10H, by conducting the above-described granulating during a predetermined set period of time, the milled powder agglomerates in the chamber 11 through contact with the organic liquid, to thereby form granules.

Once the milled powder has been charged into the chamber 11, it is preferable to purge the chamber 11 with nitrogen or other such inert gas to prevent the milled powder from oxidizing. At this point, it is even more preferable to purge the chamber 11 with an inert gas while rotating the main blade 12 for a predetermined time to loosen the milled powder, and drive out air that exists in interparticle voids in the milled powder.

Charging of the organic liquid may be performed at the same time as the milled powder, although as described above it is preferable to charge the organic liquid after the milled powder has been charged and once the main blade 12 has been rotated for a predetermined time.

After the fixed amount of organic liquid has been charged, it is also preferable to promote granulation by rotating the main blade 12 for a predetermined time to blend the milled powder into the organic liquid.

Examples of organic liquids which can be used at this point include one or two kinds selected from hydrocarbon compounds, alcohol compounds, ether compounds (including glycol ethers), ester compounds (including glycol esters), ketone compounds, fatty acid compounds and terpene compounds. Specific examples of such organic liquids include: toluene and xylene as hydrocarbon compounds; terpineol and ethanol as alcohol compounds; butyl CELLOSOLVE™ (ethylene glycol monobutyl ether), CELLOSOLVE™ (ethylene glycol monoethyl ether), CARBITOL™ (diethylene glycol monoethyl ether), and butyl CARBITOL™ (diethylene glycol monobutyl ether) as ether compounds; ethyl acetate as ester compounds; and acetone dimethyl ketone, methylisobutylketone and methylethylketone as ketone compounds.

Obviously, the present invention is not limited to the organic liquids listed above. Other organic liquids can also be used, such as, for example, ethylene glycol, diethylene glycol and the like, as well as glycerin and similar compounds.

It is noted that although the term "organic liquid" encompasses substances which are normally called "organic solvents", since in the present invention the solution does not function as a solvent, the term "organic liquid" is used.

For granules produced using an organic liquid, the organic liquid is present at least at the points where the milled powder particles are in contact with each other, whereby the milled powder particles are adhered from the liquid crosslinking force of the organic liquid. At this stage, at the points where the milled powder particles are in contact with each other, solid components, such as a binder for adhering the milled powder particles, essentially are not included in the liquid. However, if a lubricant is added in order to improve pulverizability and improve orientation during compacting, then the solid component of this lubricant can be present in the solution.

Granules produced using an organic liquid need to maintain their shape up until a predetermined step. If already-produced granules are unable to maintain their shape, fine primary alloy particles which have fallen off the granules adhere to the periphery of the granules, whereby the fluidity of the granules drops. Therefore, organic liquid used in the present invention preferably does not easily vaporize. In view of this, in the present invention, it is preferable to use an organic liquid whose saturated vapor pressure at 20° C. is no greater than 75 mmHg (10.0 kPa). More preferable is a saturated vapor pressure at 20° C. of no greater than 20 mmHg, and even more preferable is a saturated vapor pressure at 20° C. of no greater than 5 mmHg.

The organic liquid used in the present invention needs to be provided with sufficient adhesion force to keep the granules in between the primary alloy particles. It is therefore preferable in the present invention to specify the surface tension and the viscosity of the organic liquid. A preferable organic liquid surface tension at 20° C. is 20 dyn/cm or more. A more preferable surface tension at 20° C. is 25 dyn/cm or more, and an even more preferable surface tension at 20° C. is 30 dyn/cm or more. A preferable organic liquid viscosity at 20° C. is 0.35 cp or more. A more preferable viscosity at 20° C. is 1 cp or more, and an even more preferable viscosity at 20° C. is 2 cp or more.

Although the added amount of organic liquid with respect to milled powder is not especially limited, if the added amount of organic liquid is too small, granulation is difficult, because not enough liquid content can be secured to cause liquid crosslinking in the primary alloy particles. On the other hand, if the added amount of organic liquid is too large, there is the risk that it will become difficult to remove the organic liquid within a fixed time in the case of removing the organic liquid from the obtained granules. In consideration of these points, the added amount of organic liquid with respect to milled powder is recommended to be from 1.5 to 15.0% by weight. A more preferable organic liquid added amount is from 2.5 to 10.0% by weight, and an even more preferable organic liquid added amount is from 2.5 to 8.0% by weight.

Further, when forming the granules, the granules can be produced using a first organic liquid and a liquid component which has a higher saturated vapor pressure than the first organic liquid. In such a case, while the liquid component is preferably an organic liquid (a second organic liquid), a non-organic liquid such as water may be also used. Water (saturated vapor pressure at 20° C. of 17.5 mmHg) may oxidize the primary alloy particles, but in view of the facts that its loading is small and that pure water or the like can be used which oxidizes the primary alloy particles to a lesser degree, a liquid component other than an organic liquid can be used in the present invention.

FIG. 3 illustrates the saturated vapor pressure of respective organic liquids. The first organic liquid and second organic liquid may be selected with these values as a reference. Examples of the first organic liquid include terpene compounds including pinene, menthane and terpineol; butyl CARBITOL™ acetate (diethylene glycol monobutyl ether acetate), cyclohexanol, ethylene glycol, butyl CARBITOL™ (diethylene glycol monobutyl ether), diethylene glycol, CARBITOL™ (diethylene glycol monoethyl ether), CELLOSOLVE™ (ethylene glycol monoethyl ether), butyl CELLOSOLVE™ (ethylene glycol monobutyl ether), and propionic anhydride. Examples of the second organic liquid include toluene, xylene, ethanol, acetone, methylisobutylketone, ethyl acetate, methylethylketone, isobutyl alcohol, n-butyl acetate and dibutyl ether. However, the above are just examples, and are not meant to limit the scope of the present invention. For example, among the examples given as the first organic liquid, the first organic liquid and the second can be constituted, while among the examples given as the second organic liquid, the first organic liquid and the second can also be constituted.

In the case of producing the granules using a first organic liquid and a liquid component which has a higher saturated vapor pressure than the first organic liquid, the added amount of first organic liquid with respect to milled powder is preferably no greater than 6.0% by weight (not including zero). If the first organic liquid is not present, granule formation as a result of liquid crosslinking does not occur as easily. On the other hand, if 6.0% by weight is added, this is sufficient to maintain the shape of the formed granules, while adding more than that amount leads to a drop in magnetic properties. In view of these points, the added amount of first organic liquid with respect to milled powder is preferably no greater than 6.0% by weight (not including zero). In addition, the added amount of liquid component (second organic liquid) is preferably no greater than 15.0% by weight (not including zero). If the liquid component (second organic liquid) is not present, it is difficult to provide the required moisture for granule production to the milled powder, while if the added amount exceeds 15.0%, there is too mush moisture, whereby many steps are required for the removal of the liquid component (second organic liquid). In view of these points, the added amount of liquid component (second organic liquid) is preferably no greater than 15.0% by weight (not including zero). A preferable added amount of first organic liquid is no greater than 4.0% by weight (not including zero), and a preferable added amount of second organic liquid is from 6.0 to 12% by weight.

In the present invention, not only can a single organic liquid be added, but a small amount of an organic binder can also be added in addition to the organic liquid.

In such case, as the binder which constitutes the binder solution to be used, as well as using polyvinyl butyral or polyvinyl alcohol, an alcohol is used as the solvent. Using an alcohol as the solvent for the binder solution rather than water allows the increase in oxygen content in the above-described milled powder to be suppressed during granulation.

If the strength of the granules obtained by granulating is weak, the effects of an improvement in the filling properties into a die during compacting in a magnetic field cannot be sufficiently enjoyed. Here, the higher the polymerization degree of the polyvinyl butyral or polyvinyl alcohol, the greater the strength of the granules becomes. Thus, in the present invention, it is recommended to use polyvinyl butyral or polyvinyl alcohol having a polymerization degree of 200 or more. However, a polymerization degree of 200 or more is a preferable element in the present invention, but it is not an essential factor. This is because even for a polyvinyl butyral or polyvinyl alcohol having a polymerization degree of less than 200, if the added amount thereof is large, a predetermined level of granule strength can be secured. However, if polyvinyl butyral or polyvinyl alcohol is added in an increased amount, binder removal must be carried out, for example, for a longer time after compacting in a magnetic field. Magnetic properties are adversely effected by an increase in carbon residue if the binder removal is insufficient. A preferable polymerization degree of the polyvinyl butyral or polyvinyl alcohol is 500 or more, and a more preferable polymerization degree is 1,000 or more.

The amount of binder in the binder solution is preferably in the range of from 0.005 to 0.20% by weight with respect to the amount of milled powder. This is because if the amount is less than 0.005% by weight, the effect of adding the binder cannot be achieved, while if more than 0.20% by weight, the binding force is too strong, whereby orienting during the compacting in a magnetic field becomes difficult. A more preferable binder amount is from 0.02 to 0.10% by weight.

However, the polyvinyl alcohol preferably has a saponification degree of no greater than 50 mol % in order to dissolve in the alcohol as the solvent. From the perspective of solubility in alcohol, a more preferable saponification degree for the polyvinyl alcohol is 45 mol % or less, and an even more preferable saponification degree is 40 mol % or less.

The alcohol used in the present invention is, as is well known, a hydroxy compound wherein a hydrogen atom from a straight chain or a cyclic hydrocarbon has been substituted with a hydroxy group OH. Among such compounds, taking costs into account, the use of ethyl alcohol (ethanol) or methyl alcohol (methanol) is preferable.

In the present invention, granules obtained as described above can be subjected to a vibrating object, typically a vibrating sieve. Granules obtained from tumbling granulation will include granules which have adhered to each other to form a large mass, and a fine powder failed to form granules of a suitable size. Therefore, by subjecting these granules to a vibrating sieve, the large masses can be loosened up into granules having a suitable size. Further, the fine powder can be formed into granules having a suitable size by being included in other granules. Especially if organic liquid or other such liquid is contained in the granules, such liquid will ooze out of the surface of the granules and stick to the fine powder in contact therewith, thereby granulating to turn into granules having a suitable size. Thus, by vibration sieving, the granules can have a smaller size whereby the size distribution becomes narrower.

The vibrating sieve may be a commonly used apparatus which is capable of sieving the powder (granules) while applying vibrations. The granules are charged into a given vessel having a mesh-like horizontal surface provided in the vibrating sieve apparatus, and the vessel automatically vibrates from a vibrating device provided in the apparatus. The granules then freely tumble around on the mesh in the vessel, and granules having matching size fall through the mesh apertures. The mesh aperture may be chosen as appropriate, and may be, for example, from 50 to 800 µm, and preferably from 100 to 500 µm. The horizontal surface does not have to have apertures like those in a mesh, and may be an uneven horizontal surface or a flat horizontal surface that don't have any apertures. Granules are still formed from tumbling even just by tumbling around on a flat horizontal surface, and the particle sizes will be matched. In the present invention, to make the size distribution narrower, and to effectively utilize resources, it is preferable to pass all the granules through the apertures of the mesh provided in the vibrating sieve, and to use all the granules which have been passed through in the subsequent steps. However, in cases where passing through all of the granules would take a long time to carry out the step, it is acceptable to use only the granules which have passed through the mesh apertures, or to use an appropriate mixture of the granules which have passed through the mesh apertures and the granules remaining on the mesh.

The organic liquid may be either partially or completely removed from the granules which have been subjected to the vibrating sieve as described above. If the granules have been produced using a first organic liquid and a liquid component which has a higher saturated vapor pressure than the first organic liquid, the liquid component (second organic liquid) is removed.

The organic liquid has a much smaller effect on magnetic properties than that of a conventional binder such as PVA or the like. The organic liquid can also be easily removed in the below-described sintering step. However, while it is difficult to remove all of the added organic liquid, the amount added for granule production is in fact greater than the minimum required amount for forming the granules. In other words, during granule production, it is necessary for the organic liquid to provide moisture to whole of the primary alloy particles. Thus, the amount of added organic liquid is greater than the minimum required amount of organic liquid in order to form and maintain the granules. Therefore, in the present invention, the amount required to provide moisture for granule production is initially added, and once the granules have been produced, part of or all of the organic liquid is removed, whereby the remaining amount of the organic liquid in the granules is controlled. It is noted that while granules from which all of the organic liquid has been removed are in a dry state, the shape of the granules can be maintained as a result of van der Waals forces.

For an embodiment which produces granules using a first organic liquid and a liquid component which has a higher saturated vapor pressure than the first organic liquid, by adding the liquid component (second organic liquid) in addition to the first organic liquid during granule production, moisture sufficient for granule production can be provided to whole of the primary alloy particles. Thus, the amount of the added first organic liquid and liquid component (second organic liquid) is greater than the minimum required moisture content in order to maintain the granules. Therefore, in the present invention, the required amount for granule production is added as a sum of the first organic liquid and the liquid component (second organic liquid), and once the granules have been produced, the liquid component (second organic liquid) is removed, whereby the remaining amount of the organic liquid (first organic liquid) in the granules is controlled.

While the specific means for removing the organic liquid or the liquid component is not especially limited, vaporization by exposing the granules to a reduced pressure atmosphere is simple and effective. The reduced pressure atmosphere may be at room temperature, although a heated reduced pressure atmosphere or a heated atmosphere that is not reduced-pressure may also be employed. If the pressure of the reduced pressure atmosphere is too low, vaporization of the organic liquid does not proceed adequately. In view of this, the reduced pressure atmosphere in the present invention is preferably in the range of $10^{-1}$ to $10^{-5}$ Torr ($133 \times 10^{-1}$ Pa to $133 \times 10^{-5}$ Pa). However, for a heated reduced pressure atmosphere, the range of $10^0$ to $10^{-2}$ Torr ($133 \times 10^0$ Pa to $133 \times 10^{-2}$ Pa) is sufficient. At this point, if the heating temperature is too low, vaporization of the organic liquid does not proceed adequately, while conversely, if the heating temperature is too high, the primary alloy particles constituting the granules are oxidized, which can cause magnetic properties to deteriorate. Therefore, in the present invention, the heating temperature is preferably from 40 to 80° C.

For the embodiment which produces granules using a first organic liquid and a liquid component which has a higher saturated vapor pressure than the first organic liquid, vaporization by exposing the granules to a reduced pressure atmosphere is simple and effective. In the present invention, since the liquid component (second organic liquid) has a higher saturated vapor pressure than the first organic liquid, by adjusting the pressure of the reduced pressure atmosphere it is possible to remove only the liquid component (second organic liquid). The reduced pressure atmosphere may be at room temperature, although a heated reduced pressure atmosphere may also be employed. Removal of the liquid component (second organic liquid) can also be carried out by heating at atmospheric pressure.

While in the above description the step of removing the liquid is carried out after subjecting the granules to a vibrating sieve, the present invention is not limited to this, and such step can be carried out prior to subjecting the granules to the vibrating sieve. However, subjecting the granules to the vibrating sieve when they contain some liquid makes it easier for the sizes to be matched. Therefore, in the case where the liquid is removed prior to the vibrating sieve, it is preferable to carry out the treatment without removing all of the liquid, so that some organic liquid is contained in the granules by, for example, removing only the second organic liquid and subjecting to the vibrating sieve with the first organic liquid still remaining.

For granules after the step of removing the organic liquid and liquid component as described above, if the organic liquid has been partially removed, the shape of the granules is maintained as a result of liquid crosslinking of the remaining organic liquid and van der Waals forces. If the organic liquid has been completely removed, the granules are in a dry state, and thus the shape of the granules is maintained by van der Waals forces only, rendering the granules susceptible to disintegration. In the case of producing the granules using a first organic liquid and a liquid component which has a higher saturated vapor pressure than the first organic liquid, the shape of the granules can be easily maintained if the first organic liquid remains in granules from which the liquid component (second organic liquid) has been removed. On the other hand, if the amount of first organic liquid remaining in the granules is too high, the effects of the improvement in magnetic properties cannot be enjoyed. In view of this, in the embodiments of the present invention, the amount of first organic liquid remaining in the granules is preferably in the range of no greater than 6.0% by weight (not including zero). A more preferable amount of first organic liquid remaining in the granules is from 0.05 to 4.0% by weight, and a still more preferable amount of first organic liquid remaining in the granules is from 0.1 to 3.0% by weight. The above preferable amount of first organic liquid is the same even if the granules are produced using one kind of organic liquid.

The granule powder obtained as described above is subjected to compacting in a magnetic field.

The granules have excellent filling properties into the die used for compacting in a magnetic field. Therefore, not only can a compact having desired dimensional accuracy be obtained, but such granules are effective in attaining high productivity. In particular, thin-shaped or complex-shaped compacted bodies can be produced accurately and efficiently.

The compacting pressure during the compacting in a magnetic field can be set to between 0.3 and 3 ton/cm$^2$ (30 to 300 MPa). The compacting pressure may be constant from compacting start to finish, may be gradually increased or decreased, or may vary irregularly. While orientation improves the lower the compacting pressure is, if the compacting pressure is too low the strength of the compacted body is insufficient, giving rise to problems with handling. The compacting pressure is therefore set within the above range considering the above facts. The final relative density of the compacted body obtained from compacting in a magnetic field is, usually, from 50 to 60%.

The applied magnetic field may be set between 12 and 20 kOe (960 and 1,600 kA/m). By applying a magnetic field of about this intensity, the granules are disintegrated, thereby collapsing into primary alloy particles. The applied magnetic field is not limited to a magnetostatic field, and may be a pulsed magnetic field, or a combination of a magnetostatic field and a pulsed magnetic field.

In the case of granules produced from a binder solution which was formed into a solution using an organic liquid, a binder removal treatment may be performed on the compacted body if necessary. This is to prevent a drop in magnetic properties from residual carbon. The binder removal treatment can be carried out by retaining the compacted body in a hydrogen atmosphere in a temperature range of from 300 to 700° C. for between 0.25 and 3 hours. By performing a binder removal treatment under these conditions, the carbon in the binder consisting of polyvinyl butyral or polyvinyl alcohol can be almost entirely removed.

This binder removal treatment is not essential in the present invention. By suppressing the amount of binder added, the binder removal treatment may be omitted. The binder removal treatment may be omitted in cases where the binder amount is roughly 0.20% by weight or less.

In the case of carrying out a binder removal treatment, the binder removal treatment and the sintering may be handled as separate steps, or the rising temperature period when sintering may be utilized for the binder removal. For example, the binder removal may be carried out by raising the temperature from 300 to 700° C. toward a higher sintering temperature and making a hydrogen atmosphere in this temperature range for 0.25 to 3 hours.

Next, the compacted body is sintered in a vacuum or inert gas atmosphere. Although the sintering temperature needs to be adjusted depending on various conditions, such as composition, pulverization method, differences in mean particle size and size distribution and the like, the sintering may be carried out from 1,000 to 1,200° C. for between about 1 and 10 hours.

After sintering, the obtained sintered body may be subjected to an aging treatment. This step is important for controlling coercive force. If the aging treatment is carried out by splitting into two stages, it is effective to retain for a fixed time at about 800° C. and about 600° C. Conducting the heat treatment at about 800° C. after the sintering is particularly effective in a mixing method because coercive force increases. Further, since coercive force substantially increases by the heat treatment at about 600° C., if carrying out the aging treatment in a single stage, subjecting to the heat treatment at about 600° C. is better.

Next, the rare earth sintered magnet applied in the present invention will be described.

The present invention is especially preferably applied to an R-T-B system sintered magnet.

Such an R-T-B system sintered magnet comprises 25 to 37% by weight of a rare earth element (R). Here, "R" according to the present invention is a concept which includes Y, and is therefore one or more rare earth elements selected from among Y, La, Ce, Pr, Nd, Sm, Eu, Gd, Tb, Dy, Ho, Er, Tm, Yb, and Lu. If the amount of R is less than 25% by weight, the formation of the $R_2T_{14}B$ phase which serves as the main phase of an R-T-B system sintered magnet is insufficient, and α-Fe or the like having soft magnetism segregates, whereby coercive force significantly drops. On the other hand, if R exceeds 37% by weight, the volume ratio of the $R_2T_{14}B$ phase serving as the main phase drops, whereby the residual flux density drops. Further, R reacts with oxygen, whereby the oxygen content increases, and as a consequence the R rich phase which is effective in coercive force generation decreases, causing a drop in coercive force. Therefore, the amount of R is set between 25% and 37% by weight. A preferable R amount is between 28% and 35% by weight, and a more preferable R amount is between 29% and 33% by weight.

The R-T-B system sintered magnet applied in the present invention comprises 0.5% to 4.5% by weight of boron (B). If the amount of B is less than 0.5% by weight, a high coercive force cannot be attained. However, if the amount of B exceeds 4.5% by weight, the residual flux density tends to drop. Accordingly, the upper limit of B is set at 4.5% by weight. A preferable amount of B is between 0.5% and 1.5% by weight, and a more preferable amount is between 0.8% and 1.2% by weight.

The R-T-B system sintered magnet applied in the present invention may comprise 2.0% by weight or less of Co (not including zero), preferably from 0.1 to 1.0% by weight, and more preferably from 0.3 to 0.7% by weight. While Co forms the same phase as Fe, it has an effect on improving Curie temperature and on improving the corrosion resistance of the grain boundary.

The R-T-B system sintered magnet applied in the present invention may also comprise from 0.02 to 0.5% by weight of Al and/or Cu. By comprising Al and/or Cu in this range, it is possible to increase the coercive force, improve the corrosion resistance and improve the temperature properties of the obtained sintered magnet. When adding Al, a preferable Al amount is from 0.03 to 0.3% by weight, and a more preferable Al amount is from 0.05 to 0.25% by weight. When adding Cu, a preferable Cu amount is 0.15% by weight or less (not including zero), and a more preferable Cu amount is from 0.03 to 0.12% by weight.

The R-T-B system sintered magnet applied in the present invention may also comprise other elements. For example, Zr, Ti, Bi, Sn, Ga, Nb, Ta, Si, V, Ag, Ge and the like can be incorporated as appropriate. On the other hand, it is preferable to decrease impurity elements, such as oxygen, nitrogen, carbon and the like, as much as possible. The amount of oxygen in particular, which harms magnetic properties, is preferably no greater than 5,000 ppm, and more preferably no greater than 3,000 ppm. This is because the rare earth oxide phase, which is a non-magnetic component, increases if the oxygen content is large, which causes magnetic properties to drop.

While the present invention is preferably applied to an R-T-B rare earth sintered magnet, the present invention may also be applied to other rare earth sintered magnets. For example, the present invention can also be applied to an R—Co system sintered magnet.

An R—Co system sintered magnet comprises R, one or more elements selected from among Fe, Ni, Mn and Cr, and Co. In this case, it is preferable to further comprise Cu or one or more elements selected from among Nb, Zr, Ta, Hf, Ti and V. It is especially preferable to comprise Cu and one or more elements selected from among Nb, Zr, Ta, Hf, Ti and V. Among these, an intermetallic compound comprising Sm and Co in particular, and preferably a $Sm_2Co_{17}$ intermetallic compound, is made the main phase, and a subphase which mainly comprises a $SmCo_5$ system compound is present on the grain boundary. While the specific composition can be appropriately selected depending on the production method or the required magnetic properties, a preferable example could be, for example: about 20 to 30% by weight, and especially 22 to 28% by weight, of R; about 1 to 35% by weight of one kind or more of Fe, Ni, Mn and Cr; about 0 to 6% by weight, and especially 0.5 to 4% by weight, of one kind or more of Nb, Zr, Ta, Hf, Ti and V; about 0 to 10% by weight, and especially 1 to 10% by weight, of Cu; and the balance being Co.

While an R-T-B system sintered magnet and an R—Co system sintered magnet were described above, the present invention may be applied to other rare earth sintered magnets.

EXAMPLES

First Working Example

A raw material alloy was produced having a composition consisting essentially of 26.5% by weight of Nd, 5.9% by weight of Dy, 0.25% by weight of Al, 0.5% by weight of Co, 0.07% by weight of Cu, 1.0% by weight of B and the balance being Fe by strip casting.

Next, a hydrogen-assisted pulverizing treatment was carried out by causing hydrogen to occlude into the raw material alloy at room temperature, and then dehydrogenating at 600° C. for 1 hour in an Ar atmosphere.

An alloy which had undergone the hydrogen-assisted pulverizing treatment was then mixed with 0.05 to 0.1% of a lubricant for contributing to improving pulverizability and improving orientation during compacting. The mixing of the lubricant can be carried out, for example, using a Nauta mixer or similar apparatus for about 5 to 30 minutes. A milled powder having a mean particle size of 5.0 μm was then obtained using a jet mill.

The thus-obtained milled powder was charged with the various organic liquids illustrated in FIG. 4 in just the amounts illustrated in FIG. 4, and then the resultant mixtures were thoroughly kneaded with a mortar. Granules were produced from these kneaded products in the following manner. A 50 mesh sieve (first sieve) and an 83 mesh sieve (second sieve) were arranged with a predetermined distance, in an above-below alignment (the first sieve being positioned on the up-side). After the obtained kneaded product had been placed onto the first sieve, the first sieve and second sieve were both made to vibrate for a fixed period of time. Once the vibrating was finished, the granules remaining on the second sieve were collected. These granules had a particle size of between 180 and 300 μm, based on the aperture dimensions of the first sieve and second sieve. The angle of repose of the obtained granules was measured in accordance with the below method. The results are shown in FIG. 4. FIG. 4 also illustrates the angle of repose of the milled powder prior to granulation (Comparative Example 1). Further, FIG. 5 illustrates an SEM image of the exterior of some of the produced granules.

Method for measuring angle of repose: On a circular table 60 mm in diameter, granules were allowed to drop a little at a time through a fixed-height sieve. The supply of granules was stopped just before the pile of granules collapsed. The base angle of the pile of granules which had formed on the circular table was measured. The angles at three locations were measured by rotating the circular table 120° each time, and the average thereof was taken as the angle of repose.

The obtained granules were compacted in a magnetic field. Specifically, compacting was conducted in a 15 kOe magnetic field at a pressure of 1.4 ton/cm$^2$, whereby a compact was obtained.

Figure 6A:
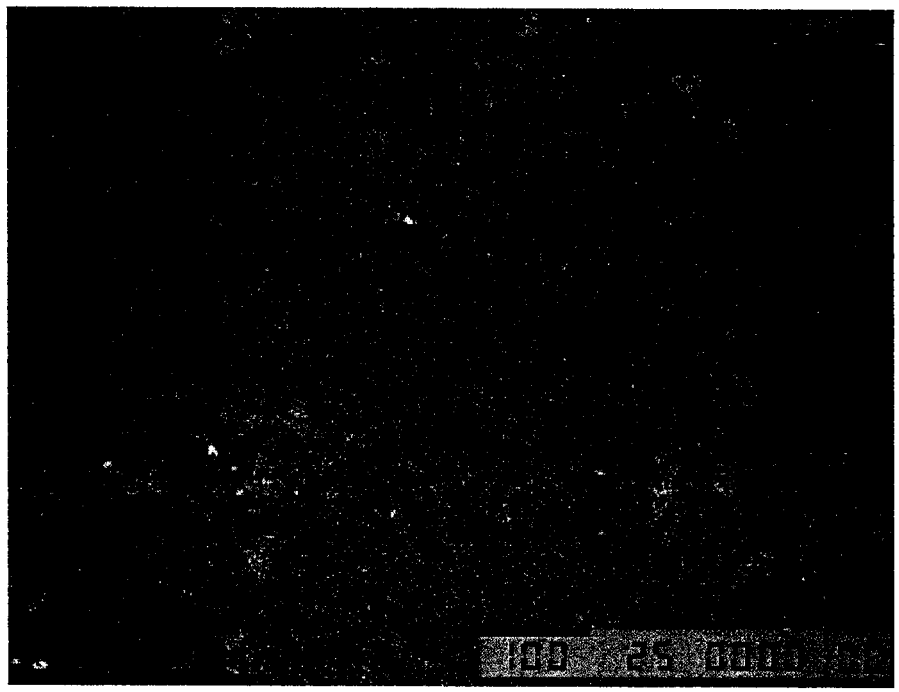
FIG. 6 is an SEM image of the exterior cross section of the compacted bodies produced in the First Working Example.
Figure 6B:
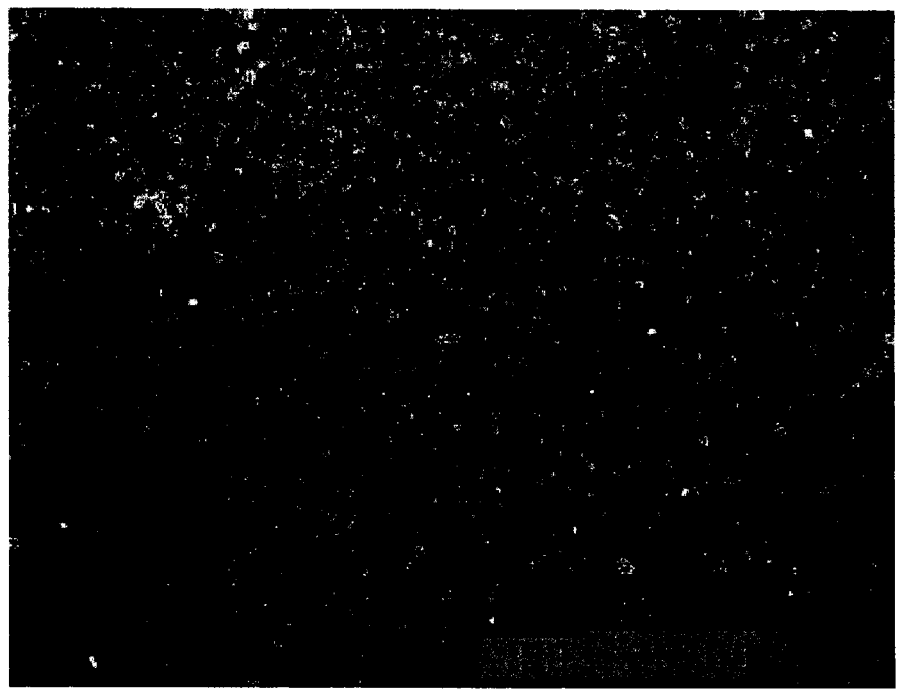

FIG. 6 illustrates the SEM images of the compacted bodies according to Example 7 and Comparative Example. FIG. 6A is an SEM photograph of the compacted body according to Example 7, and FIG. 6B is an SEM photograph of the compacted body according to Comparative Example 1. As illustrated in FIG. 6A, a compact formed from granules granulated using an organic liquid has less voids and is a more dense object than a compacted body (refer to FIG. 6B) formed without granulating the milled powder.

The obtained compacted bodies were sintered while retaining for 4 hours in a vacuum and Ar atmosphere at a temperature raised to 1,080° C. The obtained sintered bodies were then subjected to a two-stage aging treatment for 800° C.×1 hour and 560° C.×1 hour (both in an Ar atmosphere).

FIG. 4 illustrates the measured results of the magnetic properties of the obtained sintered magnets. FIG. 4 also illustrates the magnetic properties of a sintered magnet obtained in the same manner as that described above, by compacting in a magnetic field, sintering and then subjecting to an aging treatment, but without granulating the milled powder (Comparative Example 1), as well as a sintered magnet obtained in the same manner as that described above, by compacting in a magnetic field, sintering and then subjecting to an aging treatment granules obtained by spray drying a slurry which contained polystyrene as a binder (Comparative Example 2). Comparative Example 2 did not undergo a binder removal treatment.

As illustrated in FIG. 4, compared with a 60° angle of repose for the milled powder, by granulating with an organic liquid, fluidity could be improved and the angle of repose could be made 50° or lower. It can also be seen that a sintered magnet produced from granules in which an organic liquid had been used showed magnetic properties equivalent to a sintered magnet obtained by compacting a milled powder in a magnetic field (Comparative Example 1). As can be seen from Comparative Example 2, especially when producing a sintered magnet from granules in which a binder such as PVA or the like had been used, unless a binder removal treatment is performed the drop in magnetic properties is marked. Thus, the effects of the present invention of being able to attain high magnetic properties while simplifying the production steps are remarkable.

Figures 7, 8:
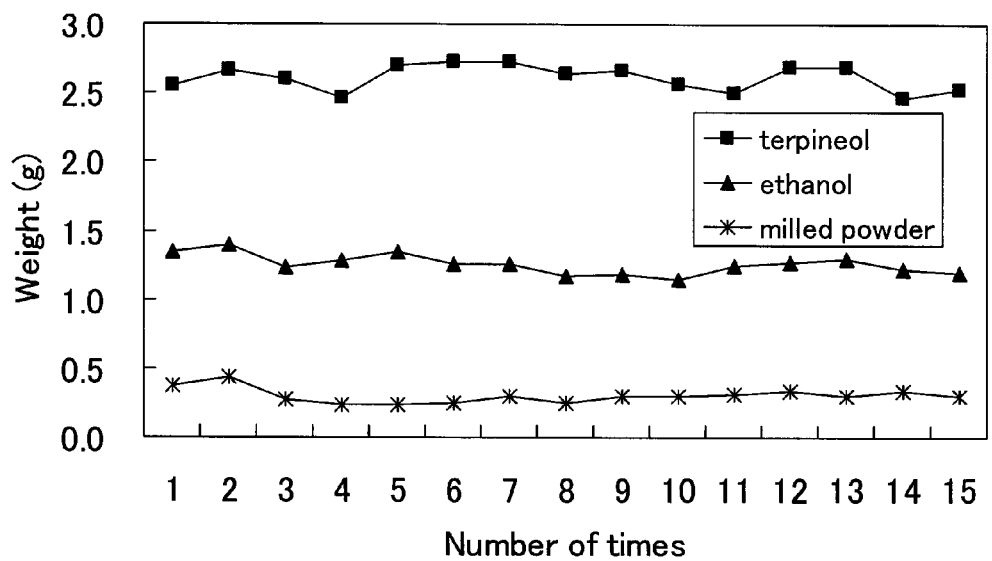
FIG. 7 is a table illustrating the observations and measured results according to the added amount of organic liquid in the First Working Example.
FIG. 8 is a graph illustrating the results of the feeder test carried out in the First Working Example.

Next, using ethanol as the organic liquid, the influence exerted by the added amount of ethanol was ascertained. These results are shown in FIG. 7. As illustrated in FIG. 7, if the added amount of ethanol as the organic liquid is too small, the moisture required for granule production is insufficient, whereby a considerable amount of milled powder which does not form granules remains. Thus, if the added amount of organic liquid is too small, granule production efficiency deteriorates. In contrast, if the added amount of ethanol as the organic liquid is too large, while there is a risk of cracks being formed, such cracks can be avoided through the removal of moisture. Further, the greater the added amount of ethanol as the organic liquid, the smaller the angle of repose becomes, whereby, as can be seen from FIG. 7, fluidity improves and the strength of the compacted body improves. From the above results, the added amount of organic liquid in First Working Example is preferably from 1.5 to 12.0% by weight, more preferably from 2.5 to 8.0% by weight, and even more preferably from 2.5 to 6.0% by weight. In addition, compacted body strength was measured by a three-point bending test on a 20 mm×18 mm×6 mm compacted body.

The merits of using granules having good fluidity include the ease of the powder filling properties into a narrow-necked die. A feeder test was carried out to confirm this. In a typical mass-production step, a device known as a "feeder" is employed to feed powder into the die. This feeder is a bin which moves in a reciprocating motion in a horizontal direction above the die, wherein feeder holes are provided on the bottom of the bin. A fixed amount of powder is contained in the bin, and if this bin is moved in a reciprocating motion, powder falls into the die from the feeder holes provided in the bin bottom. The better the fluidity of the powder, the greater the amount of powder which falls per fixed number of reciprocating motions. Consequently, a 3 mm×20 mm opening which resembled a die cavity was arranged, above which granules in which organic liquid had been used were made to reciprocate back and forth. The reciprocating motion speed was set at 0.4 m/s, and the weight of powder which had fallen into the above-described opening after 5 reciprocations was measured. The 5 reciprocations were taken as a single measuring sample, and measurement was repeated 15 times. Used as the powder were the milled powder which had not been granulated (Comparative Example 1) and the granules in which organic liquid had been used (Example 1 and Example 7). The measured results are illustrated in FIG. 8, from which it was confirmed that by using granules the filling properties into the die cavity improved.

Second Working Example

A milled powder produced in the same manner as in First Working Example was charged with 6% by weight of the various organic liquids illustrated in FIG. 9, after which granules were produced in the same manner as in First Working Example. The angle of repose of the obtained granules was measured in the same manner as in First Working Example. The results are shown in FIG. 9. FIG. 9 also illustrates the angle of repose of the milled powder prior to granulation. The above-obtained granules were exposed to a reduced pressure atmosphere (room temperature) having the degree of vacuum illustrated in FIG. 9 for from 20 to 300 minutes only.

The obtained granules were compacted in a magnetic field in the same manner as in First Working Example, whereby compacted bodies were obtained.

The obtained compacted bodies were sintered and then subjected to a two-stage aging treatment under the same conditions as in First Working Example.

FIG. 9 illustrates the measured results of the magnetic properties of the obtained sintered magnets. FIG. 9 also illustrates the magnetic properties of a sintered magnet obtained in the same manner as that described above, by compacting in a magnetic field, sintering and then subjecting to an aging treatment, but without granulating the milled powder (Comparative Example 3), as well as a sintered magnet obtained in the same manner as that described above, by compacting in a magnetic field, sintering and then subjecting to an aging treatment granules obtained by spray drying a slurry which contained polystyrene as a binder (Comparative Example 4).

As illustrated in FIG. 9, compared with a 60° angle of repose for the milled powder, by granulating with an organic liquid, the angle of repose could be made 50° or lower and fluidity could be improved. It can also be seen that a sintered magnet produced from granules in which an organic liquid had been used comprised magnetic properties equivalent to a sintered magnet obtained by compacting a milled powder in a magnetic field. As can be seen from Comparative Example 4, especially when producing a sintered magnet from granules in which a binder such as PVA or the like had been used, unless a binder removal treatment is performed the drop in magnetic properties is marked. Thus, the effects of the present invention of being able to attain high magnetic properties while simplifying the production steps are remarkable.

Further, as illustrated in FIG. 9, by exposing the granules to a reduced pressure atmosphere after they have been produced, the amount of residual organic liquid can be regulated, and, magnetic properties can be improved.

Next, sintered magnets were produced in the same manner as described above, except that 4% by weight of terpineol was added as the organic liquid, and that the granules were exposed at a 55° C. reduced pressure atmosphere of $10^{-1}$ Torr, and their magnetic properties were measured. The results are shown in FIG. 10. The residual amount of the organic liquid was regulated by varying the exposure time to the reduced pressure atmosphere.

As illustrated in FIG. 10, by applying heat the residual amount of the organic liquid could be regulated even in a low vacuum atmosphere of about $10^{-1}$ Torr. Further, even if the residual amount of terpineol was about 0.06% by weight, the shape of the granules was maintained, and the angle of repose could be made 50° or lower.

Next, using ethanol as the organic liquid, the influence exerted by the added amount of ethanol was ascertained. These results are shown in FIG. 11. As illustrated in FIG. 11, if the added amount of ethanol as the organic liquid is too small, the moisture required for granule production is insufficient, whereby a considerable amount of milled powder which does not form granules remains. Thus, if the added amount organic liquid is too small, granule production efficiency deteriorates. On the other hand, if added amount of ethanol as the organic liquid is too large, there is too much moisture, so that unless either more time is given to removing the ethanol, or the pressure is further reduced, the problem of crack formation will arise after compacting as a result of the moisture content being too large. Further, the greater the added amount of ethanol as the organic liquid, the smaller the angle of repose becomes, whereby, as can be seen from FIG.

11, fluidity improves, and the strength of the compacted body improves. Compacted body strength was measured by a three-point bending test on a 20 mm×18 mm×6 mm compact. From the above results, the added amount of organic liquid in Second Working Example is preferably from 1.5 to 15.0% by weight, more preferably from 2.5 to 10.0% by weight, and even more preferably from 2.5 to 8.0% by weight.

Third Working Example

A milled powder produced in the same manner as in First Working Example was charged with 6% by weight of the various organic liquids illustrated in FIG. 12, after which granules were produced in the same manner as in First Working Example.

Next, the produced granules were exposed to a reduced pressure atmosphere (room temperature) having the degree of vacuum illustrated in FIG. 12 for from 30 to 360 minutes only, whereby the organic liquid was completely vaporized (i.e. the organic liquid content was decreased to approximately zero, below the detection lower limit), thereby drying the granules.

The angle of repose of the granules from which the organic liquid had been vaporized was measured in the same manner as in First Working Example. The results are shown in FIG. 12. FIG. 12 also illustrates the angle of repose of the milled powder prior to granulation.

The obtained granules were compacted in a magnetic field in the same manner as in First Working Example, whereby compacted bodies were obtained.

The obtained compacted bodies were sintered and then subjected to a two-stage aging treatment under the same conditions as in First Working Example.

FIG. 12 illustrates the measured results of the magnetic properties of the obtained sintered magnets. FIG. 12 also illustrates the magnetic properties of a sintered magnet obtained in the same manner as that described above, by compacting in a magnetic field, sintering and then subjecting to an aging treatment, but without granulating the milled powder (Comparative Example 5), as well as a sintered magnet obtained in the same manner as that described above, by compacting in a magnetic field, sintering and then subjecting to an aging treatment granules obtained by spray drying a slurry which contained polystyrene as a binder (Comparative Example 6).

As illustrated in FIG. 12, compared with the 60° angle of repose for the milled powder of Comparative Example 5, for granules which were granulated with an organic liquid and then formed into a dried state, the angle of repose was 53° or lower and fluidity could be improved. It can also be seen that a sintered magnet produced from granules in which an organic liquid had been used comprised magnetic properties equivalent to a sintered magnet obtained by compacting a milled powder in a magnetic field. As can be seen from Comparative Example 6, especially when producing a sintered magnet from granules in which a binder such as PVA or the like had been used, unless a binder removal treatment is performed the drop in magnetic properties is marked. Thus, the effects of the present invention of being able to attain high magnetic properties while simplifying the production steps are remarkable.

Next, sintered magnets were produced in the same manner as described above, by respectively adding 6% by weight of the substances illustrated in FIG. 13 as the organic liquid and forming the granules in the same manner as described above, then exposing the granules to a 55° C. reduced pressure atmosphere of $10^{-1}$ Torr, and completely removing the organic liquid (below the detection lower limit). The angle of repose and magnetic properties of the sintered magnets were measured. These results are shown in FIG. 13. The exposure time to the reduced pressure atmosphere was adjusted so that the organic liquid would be completely removed.

As illustrated in FIG. 13, by applying heat the angle of repose for granules from which the organic liquid had been completely removed could be made 53° or lower even in a low vacuum atmosphere of about $10^{-1}$ Torr, whereby it was learned that magnetic properties could be achieved equivalent to a sintered magnet obtained by compacting a milled powder in a magnetic field.

Figures 14, 15:
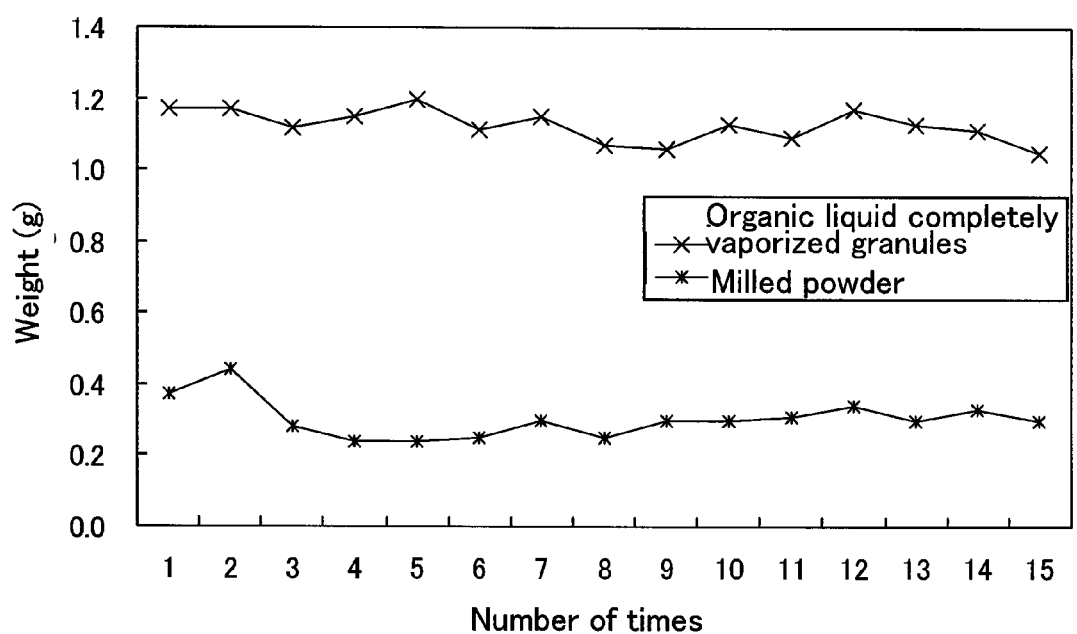
FIG. 14 is a table illustrating the observed results according to the added amount of organic liquid in the Third Working Example.
FIG. 15 is a graph illustrating the results of the feeder test carried out in the Third Working Example.

Next, using ethanol as the organic liquid, the influence exerted by the added amount of ethanol was ascertained. These results are shown in FIG. 14. As illustrated in FIG. 14, if the added amount of ethanol as the organic liquid is too small, the moisture required for granule production is insufficient, whereby a considerable amount of milled powder which does not form granules remains, and granule production efficiency deteriorates. On the other hand, if the added amount of ethanol is too large, there is too much moisture, so that unless either more time is given to removing the ethanol, or the pressure is further reduced, the ethanol cannot be completely removed. From the above results, the added amount of organic liquid is preferably from 1.5 to 15.0% by weight, more preferably from 2.5 to 10.0% by weight, and even more preferably from 2.5 to 8.0% by weight.

A feeder test was also carried out in the manner described above on granules which were granulated in the same manner as in First Working Example using toluene as the organic liquid, and from which the organic liquid had been completely vaporized (Example 25), and on the above-described milled powder which had not been granulated (Comparative Example 5). These results are shown in FIG. 15, from which it was confirmed that by using granules the filling properties into a die cavity could be improved.

Fourth Working Example

A milled powder produced in the same manner as First Working Example was charged with a first organic liquid (terpineol) and a second organic liquid (toluene) as illustrated in FIG. 16 added in just the amounts illustrated in FIG. 16, and the resultant mixtures were then thoroughly kneaded with a mortar. Granules were produced in the same manner as in First Working Example using these kneaded products. The resultant granules were retained for between 10 and 120 minutes in a 1.0 Torr atmosphere. The angle of repose of the obtained granules was then measured in the same manner as in First Working Example. The results are shown in FIG. 16. FIG. 16 also illustrates the angle of repose of the milled powder prior to granulation (bottommost row of FIG. 16).

The obtained granules were compacted in a magnetic field in the same manner as in First Working Example, whereby compacted bodies were obtained.

The obtained compacted bodies were sintered and then subjected to a two-stage aging treatment under the same conditions as in First Working Example.

FIG. 16 illustrates the measured results of the magnetic properties of the obtained sintered magnets. FIG. 16 also illustrates the magnetic properties of a sintered magnet obtained in the same manner as that described above, by compacting in a magnetic field, sintering and then subjecting to an aging treatment, but without granulating the milled powder (bottommost row of FIG. 16).

As illustrated in FIG. 16, compared with a 60° angle of repose for the milled powder, by granulating with an organic liquid, the angle of repose could be made 50° or lower, and fluidity could be improved. It can also be seen that a sintered magnet produced from granules in which an organic liquid had been used comprised magnetic properties equivalent to a sintered magnet obtained by compacting a milled powder in a magnetic field.

Further, by exposing granules which have already been produced to a reduced pressure atmosphere, the toluene acting as the second organic liquid can be removed, and, the magnetic properties can be improved. Confirmation of the residual amounts of terpineol and toluene after the exposure to a reduced pressure atmosphere showed that the terpineol generally remained in the amount that was added, while the toluene had been completely vaporized.

Sintered magnets were obtained in the same manner as described above, except that the organic liquids (first organic liquid, second organic liquid) illustrated in FIG. 17 were used, and then evaluated in the same manner as described above for their angle of repose and magnetic properties. These results are shown in FIG. 17.

Figure 18:
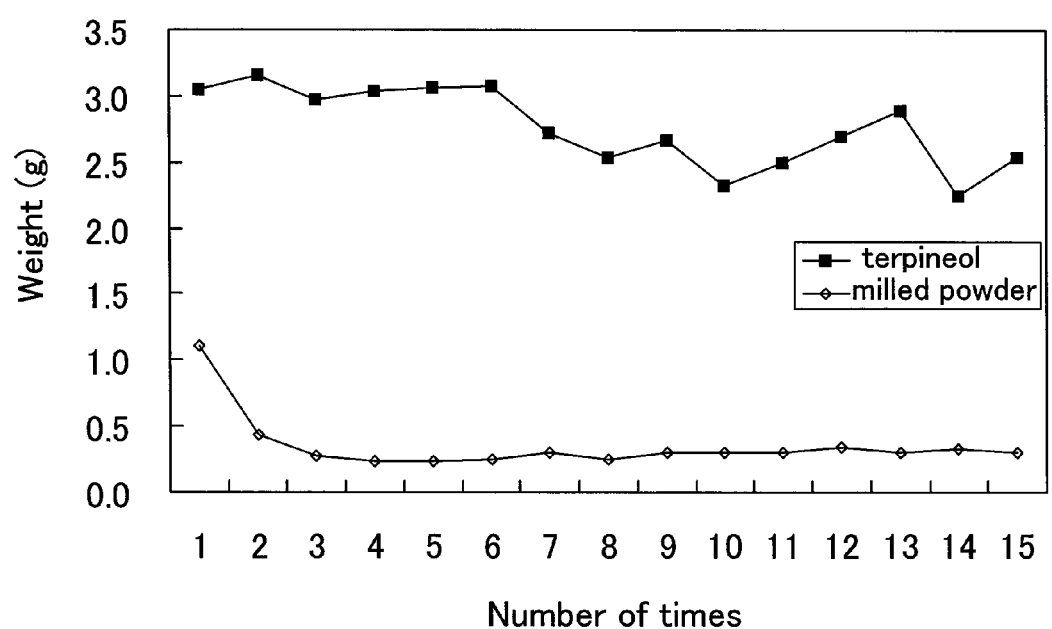
FIG. 18 is a graph illustrating the results of the feeder test carried out in the Fourth Working Example.

A feeder test was carried out in the same manner as in First Working Example. Used as the powder were the above-described milled powder which had not been granulated and the granules in which an organic liquid had been used. The results are shown in FIG. 18, from which it was confirmed that by using granules the filling properties into a die cavity could be improved.

Fifth Working Example

Milled powder produced in the same manner as in First Working Example were placed inside the chamber of a granulating machine, and the chamber interior was filled with nitrogen to prevent oxidation. The granulating machines used at this stage were a vertical type apparatus (Examples 29 to 38; chamber volume of 4 liters) as illustrated in FIG. 1 and a horizontal type apparatus (Examples 39 to 44; chamber volume of 1.5 liters) as illustrated in FIG. 2.

Next, the main rotor blade of the granulating machine was rotated at a given speed to stir the milled powder. An auxiliary rotor blade was also rotated. As the organic liquid, terpineol was used as a first organic liquid, and ethanol was used as a second organic liquid, and these were charged using a nozzle into the chamber for a predetermined time (solution charging time t1) in the amounts shown in FIG. 19.

Even once all of the organic liquid had been added, the main rotor blade and the auxiliary rotor blade were kept rotating for a predetermined time (blending time t2) to blend the organic liquid and milled powder together. The main rotor blade and auxiliary rotor blade were subsequently stopped, and the granule was removed from the chamber.

Next, the second organic liquid contained in the removed granules was caused to evaporate. To prevent the milled powder from oxidizing, a vacuum chamber was employed for the evaporation, wherein evaporation was conducted under a reduced pressure atmosphere.

Once the second organic liquid contained in the removed granules had evaporated, evaporation of the first organic liquid was further conducted (Example 38).

As comparative examples, tumbling fluidized bed granule formation was also carried out. In tumbling fluidized bed granule formation, a fluidized bed is prepared using a nitrogen jet, and a tumbling motion is created by a rotor blade rotating in a perpendicular direction to the ground (Comparative Examples 7 and 8).

FIG. 20 illustrates an SEM image of the cross section of the produced granules.

As illustrated in FIG. 20, in Comparative Examples 7 and 8, in which the granules were formed using a tumbling fluidized bed system, there was a large quantity of powder mixed in apart from the granules. In contrast, in Examples 30 and 31, in which the granules were formed using a horizontal type tumbling system, there was hardly any powder mixed in, and the granules were well formed, so that it can be said that a large yield could be obtained.

The angle of repose for the granules from which the organic liquid had been vaporized was measured in the same manner as in First Working Example. The results are shown in FIG. 19. FIG. 19 also illustrates the angle of repose of the milled powder prior to granulation (Comparative Example 9).

Next, the obtained granules were compacted in a magnetic field in the same manner as in First Working Example, whereby compacted bodies were obtained.

The obtained compacted bodies were sintered and then subjected to a two-stage aging treatment under the same conditions as in First Working Example.

FIG. 19 illustrates the measured results of the magnetic properties of the obtained sintered magnets. Further, FIG. 19 also illustrates the magnetic properties of sintered magnets obtained in the same manner as that described above, by compacting in a magnetic field, sintering and then subjecting to an aging treatment granules obtained by tumbling fluidized bed granule formation, (Comparative Examples 7 and 8), a sintered magnet obtained in the same manner as that described above, by compacting in a magnetic field, sintering and then subjecting to an aging treatment, but without granulating the milled powder (Comparative Example 9), as well as a sintered magnet obtained in the same manner as that described above, by compacting in a magnetic field, sintering and then subjecting to an aging treatment granules obtained by spray drying a slurry which contained 0.5% by weight of PVA as a binder (Comparative Example 10).

As illustrated in FIG. 19, for granules formed by a tumbling system in which an organic liquid had been used, the angle of repose could be made 57° or lower. Further, unless a long time was expended for the addition of the organic liquid (roughly within 450 seconds), the angle of repose could be made 53° or lower (Examples 29 to 33 and 35 to 44). In addition, depending on the added amount of the first organic liquid and second organic liquid, the angle of repose could be made 48° or lower (Examples 29 to 33, 36, 37, 40, 41, 43 and 44). Even in Example 38, wherein as well as the second organic liquid, the first organic liquid was also removed under the same conditions as in Example 32, the angle of repose could be made 50° or lower, yet magnetic properties could be attained which were even higher than those of Example 32. Thus, for granules formed by a tumbling system in which an organic liquid had been used, fluidity could be improved as compared with Comparative Example 9, whose angle of repose of the milled powder was 60°. Further, it can be seen that a sintered magnet produced from granules formed by a tumbling system and in which an organic liquid had been used, comprised magnetic properties equivalent to a sintered magnet obtained by compacting a milled powder in a magnetic field. As can be seen from Comparative Example 10, especially when producing a sintered magnet from granules in which a binder such as PVA or the like had been used, unless a binder removal treatment is performed the drop in magnetic properties is marked. Thus, the effects of the present invention of being able to attain high magnetic properties while simplifying the production steps are remarkable.

Sixth Working Example

A milled powder produced in the same manner as in First Working Example was placed inside the chamber of a granulating machine, and the chamber interior was filled with nitrogen to prevent oxidation. The granulating machines used at this stage were a vertical type apparatus (chamber volume of 4 liters) as illustrated in FIG. 1 and a horizontal type apparatus (chamber volume of 1.5 liters) as illustrated in FIG. 2.

Next, the main rotor blade of the granulating machine was rotated at a given speed to stir the milled powder. An auxiliary rotor blade was also rotated. The binder solution was made up with polyvinyl butyral as the binder, wherein the polyvinyl butyral was dispersed in ethanol acting as the solvent. This binder solution was charged using a nozzle into the chamber for a predetermined time in the concentrations shown in FIG. 21.

Even once all of the binder solution had been added, the main rotor blade and the auxiliary rotor blade were kept rotating for a predetermined time to blend the binder solution and milled powder together. The main rotor blade and auxiliary rotor blade were subsequently stopped, and the formed granule matter was removed from the chamber.

Next, the ethanol of the binder solution contained in the removed granules (formed granule matter) was caused to evaporate. To prevent the milled powder from oxidizing, a vacuum chamber was employed for the evaporation, wherein evaporation was conducted under a reduced pressure atmosphere.

For comparison, granules were produced using an extrusion granulating method, a tumbling fluidized bed granulating method and a spray drying method. In the extrusion granulating method, a primary alloy powder was formed into a paste, and this paste was extruded from fine pores using a screw (Comparative Example 11). In the tumbling fluidized bed granulating method, a fluidized bed was created inside a chamber by a nitrogen jet, and a tumbling motion was created by a rotor blade rotating in a perpendicular direction to the ground, whereby granules were formed (Comparative Examples 12 and 13). In the spray drying method, granules were produced using polyvinyl butyral as the binder in the concentrations shown in FIG. 21, and using ethanol as the solvent (Comparative Examples 14 and 15).

FIGS. 22 and 23 illustrate SEM images of the exterior of the produced granules.

Figure 22A:
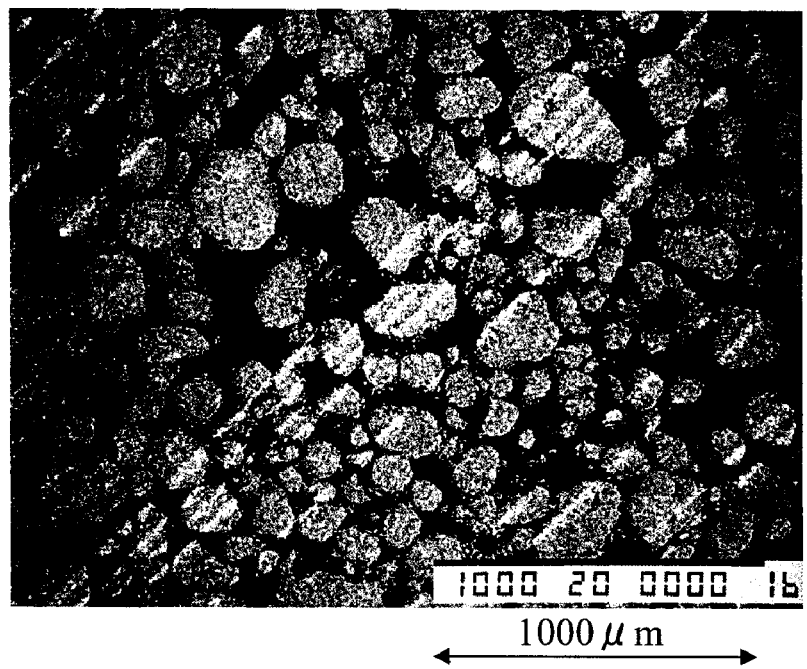
FIG. 22 is an SEM image illustrating the cross section of the granules produced in the Sixth Working Example.
Figure 22B:
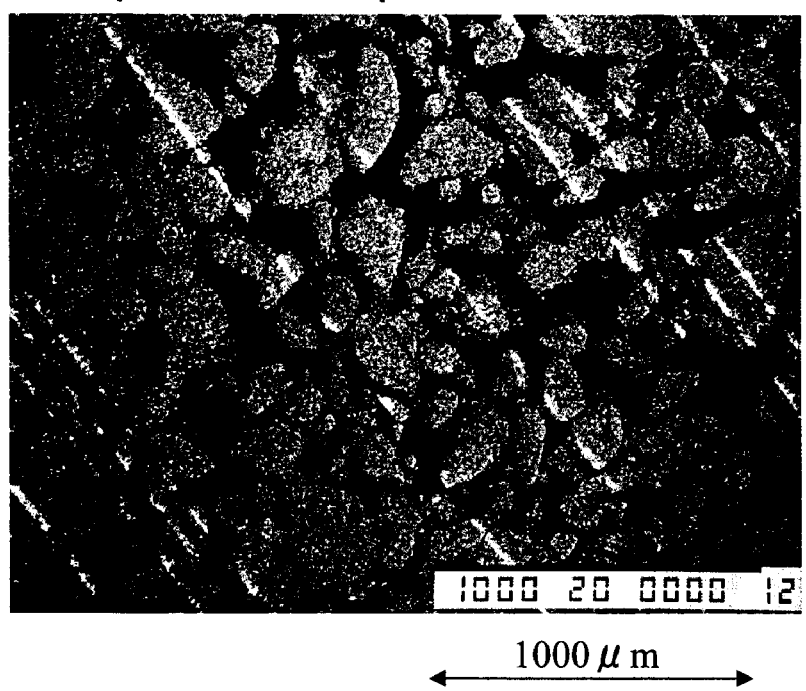
Figure 23A:
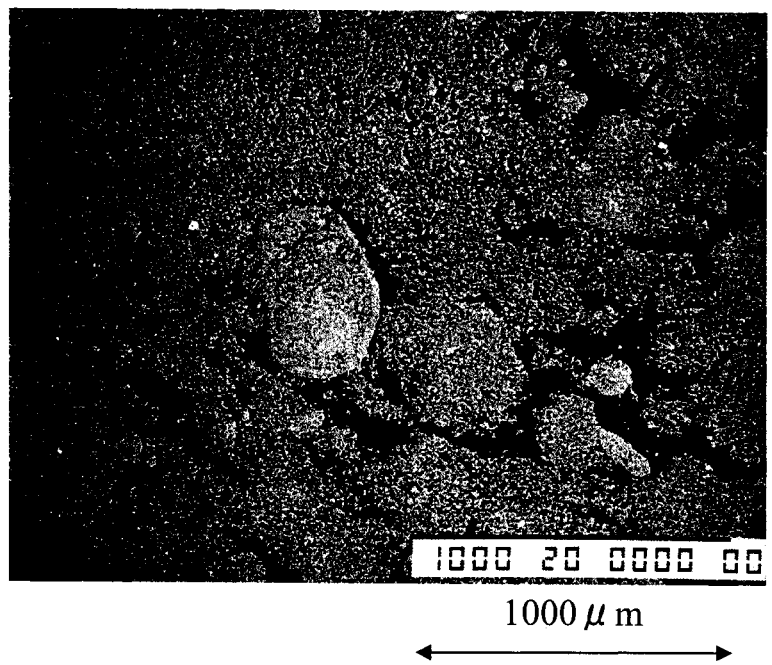
FIG. 23A is an SEM image illustrating the cross section of the granules produced in the Sixth Working Example and FIG. 23B is an SEM image illustrating the exterior of the granules produced in the Sixth Working Example.
Figure 23B:
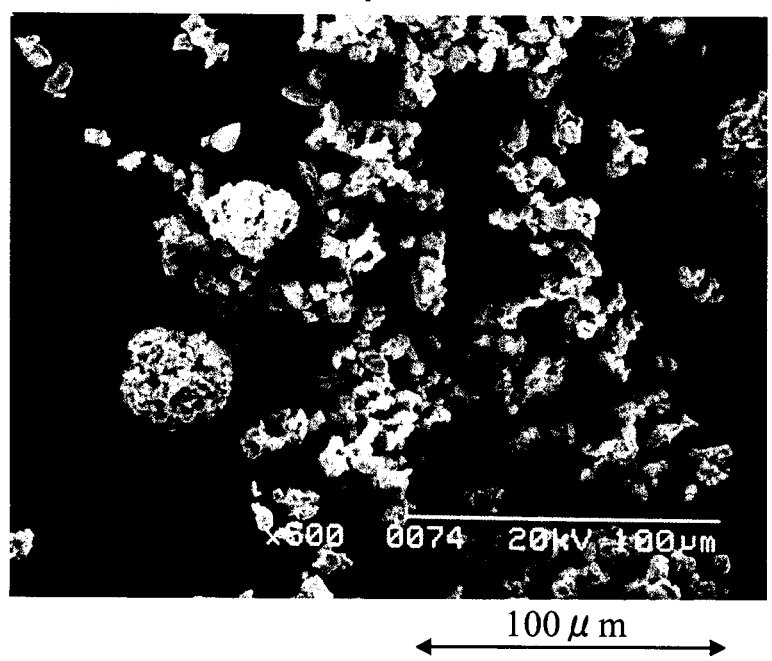

As illustrated in FIG. 22A, the granules from Second Working Example formed by a tumbling method were well formed. Further, as illustrated in FIG. 22B, the granules produced by an extrusion granulating method were similarly well formed. In contrast, as illustrated in FIG. 23A, when granules were formed by a tumbling fluidized bed system a large quantity of powder was mixed in apart from the granules. Further, as illustrated in FIG. 23B, granules produced by a spray drying method had a dramatically smaller particle size than the granules produced by the above three granulating methods.

The granule strength of the obtained granules was measured. Measurement was conducted using a granule strength measuring apparatus. The measurement method applied a load on a single granule, and the maximum load that had been applied up until the point where the load was released due to the granule being destroyed was taken as the measured value P. Granule strength was calculated using the following equation from the particle size d of that granule. The results are shown in FIG. 21.

Granule strength $St = 2.8P/(\pi \times d^2)$

As illustrated in FIG. 21, it can be seen that in Examples 46 and 47, which employed a tumbling granulating method, granule strength was substantially higher than in the extrusion granulating method or tumbling fluidized bed granulating method. Example 46 in particular produced granules having a high granule strength with a small amount of binder from which granule production itself would be difficult with other granulating methods.

The angle of repose of these granules was also measured in the same manner as in First Working Example. The results are shown in FIG. 21. FIG. 21 also illustrates the angle of repose of the milled powder (Comparative Example 16) prior to granulation.

From these results, it can be seen that in Examples 46 and 47, which employed a tumbling granulating method, the angle of repose was 47° or less, and fluidity was substantially greater than in the tumbling fluidized bed granulating method or spray drying method.

Next, the obtained granules were compacted in a magnetic field in the same manner as in First Working Example, whereby compacted bodies were obtained. The strength of the obtained compacted bodies was measured.

Regarding the obtained compacted bodies, a binder removal treatment was carried out on the compacted bodies of Comparative Examples 13 to 15 formed from granules produced by an extrusion granulating method or spray drying method.

The obtained compacted bodies were sintered and then subjected to a two-stage aging treatment under the same conditions as in First Working Example.

FIG. 21 illustrates the measured results of the magnetic properties of the obtained sintered magnets. For comparison, FIG. 21 also illustrates the magnetic properties of sintered magnets obtained in the same manner as that described above, by compacting in a magnetic field, sintering and then subjecting to an aging treatment, but wherein the granules had been obtained by a tumbling fluidized bed granulating method, extrusion granulating method or spray drying method.

As illustrated in FIG. 21, it can be seen that a sintered magnet produced from granules which had been produced by a tumbling granulating method using a binder solution comprised magnetic properties equivalent to a sintered magnet obtained by compacting a milled powder in a magnetic field.

Thus, granules produced by a tumbling granulating method possess high fluidity and sufficient granule strength, and can produce a sintered magnet which has high magnetic properties. Moreover, such granules can be formed with a smaller amount of binder than that of other granulating methods, thereby allowing the binder removal treatment to be omitted, and thus there is a large effect in terms of the number of steps.

Seventh Working Example

A milled powder produced in the same manner as in First Working Example was placed inside the chamber of a granulating machine, and the chamber interior was filled with nitrogen to prevent oxidation. The granulating machine was a horizontal type apparatus (chamber volume of 1.5 liters) as illustrated in FIG. 2.

Next, the main blade of the granulating machine was rotated at a given speed to stir the milled powder. An auxiliary blade was also rotated. As the organic liquid, 80 g of terpineol (first organic liquid) and 270 g of ethanol (second organic liquid) were charged into 4,000 g of milled powder by spraying into the chamber with a nozzle for a predetermined time.

Even once all of the organic liquid had been added, the main blade and the auxiliary blade were kept rotating for a predetermined time to blend the organic liquid and milled powder together. The main blade and auxiliary blade were subsequently stopped, and the formed granule matter was removed from the chamber.

Next, the ethanol used as the second organic liquid contained in the removed granules (formed granule matter) was removed by evaporation. To prevent oxidation of the milled powder, a vacuum chamber was employed for the evaporation, wherein evaporation was conducted under a reduced pressure atmosphere. Granules from which the ethanol had been removed in such a manner were then subjected to a vibrating sieve. A power sieve ("AFN-300", manufactured by Nitto Kagaku Co., Ltd.; 2,800 rpm) was employed as the vibrating sieve. The granules of Example 48 were obtained by vibrating granules for 1 minute on this vibrating sieve using a stainless steel vessel which was not equipped with a mesh. The granules of Example 49 were obtained by vibrating granules for 1 minute on this vibrating sieve using a mesh having apertures of 500 microns. In addition, the granules of Example 50 were obtained by vibrating the granules prior to the above-described ethanol removal (i.e. the granules containing both ethanol and terpineol) for 1 minute on this vibrating sieve using a mesh having apertures of 500 microns, and then subsequently removing the ethanol by the method described above.

Further, as Comparative Example 17, granules were obtained without subjecting to a vibrating sieve and from which the ethanol had been removed.

To investigate the size distribution of Examples 48 to 50 and Comparative Example 17, sieving was carried out in small amounts while applying the minimum force necessary to pass through the mesh so as to avoid vibrating the granules as much as possible. The results are shown in the graph of FIG. 24.

Figure 24:
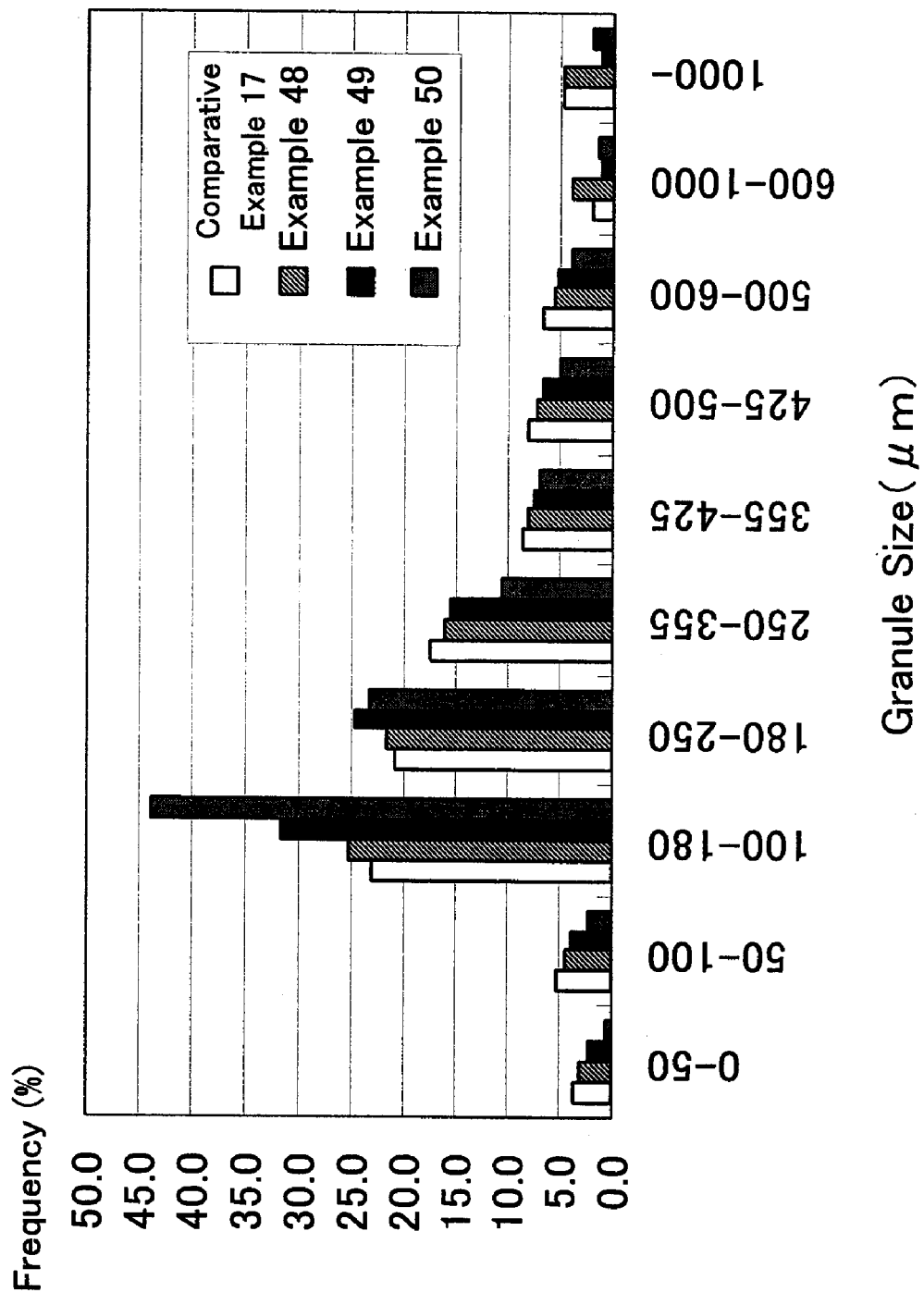
FIG. 24 is a graph illustrating the size distribution of the granules produced in the Seventh Working Example.

As illustrated in FIG. 24, a comparison of Example 48 with Comparative Example 17 shows that even if there are no apertures in the mesh, just by applying vibration, granules are formed by being tumbled together, and fine powder is reduced. In Example 49, wherein a vibrating sieve which did have apertures was used, it can be seen that the size distribution was further narrowed, and that the granules were concentrated at a predetermined size. This is thought to be because by vibrating with a vibrating sieve, the granules tumble around on the mesh, thereby further promoting the formation of granules. In addition, since granules formed at 500 microns or less are made to pass through a mesh, the granules do not become enlarged as a consequence of being tumbled around. In Example 50, wherein the granules were subjected to the vibrating sieve prior to being dried, it can be seen that the size distribution was even narrower than that in Example 49, and that the granules were concentrated at a predetermined size. By subjecting the liquid-containing granules to a vibrating sieve in this manner, fine powder adhered to the granules as a consequence of the tumbling action, whereby the fine powder decreased. Further, excessively large granules were broken up from the vibrations, so that the granules had a more suitably small size. As a result of this, it is thought that the particle size distribution was narrowed.

FIG. 25 illustrates SEM images of the cross section of the granules of Example 49, Example 50 and Comparative Example 17 which were 500 μm or less. As is clear from FIG. 25, the granules of Example 49 and 50, in which a vibrating sieve was applied, had little fine powder. Perhaps because there was an especially large amount of liquid in Example 50, which was subjected to vibrating prior to drying, the granules were more round, particle size was small and size was even. The angle of repose of these samples was measured in the same manner as in First Working Example. Compared with 50.7° in Comparative Example 17, the angle of repose in Example 49 was 48.3°, and in Example 50 44.8°. It was thus learned that by using a vibrating sieve, fine powder decreased and fluidity improved.

Next, as the organic liquid, the granules of Examples 51 to 53 and Comparative Example 18 were obtained in the same manner as in Examples 48 to 50 and Comparative Example 17, except that 20 g of terpineol and 330 g of ethanol with respect to 4,000 g of milled powder were used. The angle of repose of the obtained granules of Examples 51 to 53 and Comparative Example 18 was measured.

The filling variability into a die for the below blends was also measured. A die having a 15 mm×4 mm aperture was attached to a machine for compacting in a magnetic field. Granules were fed using a feeder so as to completely fill the die. This feeder is a bin which moves in a reciprocating motion in a horizontal direction above the die, wherein feeder holes are provided on the bottom of the bin. A fixed amount of granules is contained in the bin, so that if this bin is moved in a reciprocating motion, powder falls into the die from the feeder holes provided in the bin bottom. The better the fluidity of the granules, the greater the amount of granules which falls per fixed number of reciprocating motions. After granules were filled into the die in this manner, compacting was carried out in a 15 kOe magnetic field and a 1.4 ton/cm$^2$ pressure, whereby compacted bodies were obtained. The weight of the obtained compacted bodies was measured. Compacting in a magnetic field was repeated 50 times for the respective granules, and the filling variability (%) was taken as the standard deviation σ of each compact weight divided by the average weight, σ/ave., multiplied by 100. Dividing by the average weight standardizes the filled weight of the respective granules which have differing bulk densities.

In addition, the strength of the compacted bodies comprising the granules of Examples 51 to 53 and of Comparative Example 18 was measured. Compacted body strength was measured by weighing out 10 g of the respective granules, filling into a die having an 18 mm×20 mm aperture, compacting in a magnetic field under the same conditions as described above, and then using a three-point bending test to measure the flexural strength.

Compacted bodies obtained as described above were sintered while retaining for 4 hours in a vacuum and Ar atmosphere at a temperature raised to 1,080° C. The obtained sintered bodies were then subjected to a two-stage aging treatment for 800° C.×1 hour and 560° C.×1 hour (both in an Ar atmosphere).

FIG. 26 shows the measured results of the angle of repose, filling variability, and sintered magnet magnetic properties of Examples 51 to 53 and Comparative Example 18. FIG. 26 also illustrates as "original material" a sintered magnet that was sintered and compacted using the same milled powder material as that of Examples 51 to 53, but which had not been granulated to form the granules, and which had not been subjected to a sieve.

As illustrated in FIG. 26, it can be seen that Examples 51 to 53, which were subjected to a vibrating sieve, had a lower angle of repose and higher fluidity than the original material as well as Comparative Example 18. In particular, Example 53, which was subjected to a vibrating sieve while still containing liquid, had the lowest angle of repose. It can also be seen that the lower the value of the angle of repose and the better the fluidity of the powder, the easier it is to fill into the die, and as a result, the smaller the filling variability becomes. Moreover, Example 53 was also superior to Comparative Example 18, and Examples 51 and 52 in terms of magnetic properties. While the original material had higher magnetic properties than Comparative Example 18, and Examples 51 to 53, its angle of repose was large and fluidity poor, so that filling variability dramatically deteriorated.

The invention claimed is:

1. A method for producing a rare earth sintered magnet comprising the steps of:
charging into a die cavity granules of primary alloy particles having a predetermined composition adhered together by an organic liquid free of polymer and comprising at least one member selected from the group consisting of ethanol, toluene, methyl isobutyl ketone, diethylene glycol monoethyl ether, terpene compounds, diethylene glycol monobutyl ether, diethylene glycol monobutyl ether acetate, n-butyl acetate, ethylene glycol monobutyl ether, cyclohexanol, terpineol, pinene, dibutyl ether, xylene, cyclohexanone, propionic anhydride, and menthane;
obtaining a compacted body by applying a magnetic field to the granules and compressing the granules; and
sintering the compacted body.

2. The method for producing a rare earth sintered magnet according to claim 1, wherein the granules are charged with from 1.5 to 15.0% by weight of the organic liquid with respect to the primary alloy particles.

3. The method for producing a rare earth sintered magnet according to claim 1, wherein the angle of repose of the granules is 53° or less.

4. The method for producing a rare earth sintered magnet according to claim 1, characterized in that the primary alloy particles have a composition which comprises an $R_2T_{14}B$ phase (wherein R is one or more elements selected from the group consisting of rare earth elements (rare earth elements being a concept which includes Y (yttrium)), and T is one or more elements selected from the group consisting of transition metal elements including Fe or Fe and Co), and mean particle size is between 2.5 and 6 µm.

5. The method for producing a rare earth sintered magnet according to claim 1, wherein the granules are charged into the die cavity after the organic liquid has been removed from the granules.

6. The method for producing a rare earth sintered magnet according to claim 5, wherein a part of the organic liquid is removed from the granules.

7. The method for producing a rare earth sintered magnet according to claim 5, wherein the organic liquid is removed until the granules are dry.

8. The method for producing a rare earth sintered magnet according to claim 5, wherein the organic liquid is removed by exposing the granules to a reduced pressure atmosphere.

9. The method for producing a rare earth sintered magnet according to claim 5, wherein the organic liquid is removed by exposing the granules to an atmosphere heated to a predetermined temperature.

10. The method for producing a rare earth sintered magnet according to claim 1, wherein:
the organic liquid comprises a first organic liquid and a second organic liquid different from the first organic liquid; and
the granules are charged into the die cavity after the second organic liquid has been removed from the granules.

11. The method for producing a rare earth sintered magnet according to claim 10, wherein the second organic liquid has a higher saturated vapor pressure than the first organic liquid.

12. The method for producing a rare earth sintered magnet according to claim 10, wherein the removal treatment preferentially vaporizes the second organic liquid over the first organic liquid.

13. The method for producing a rare earth sintered magnet according to claim 10, wherein the removal treatment exposes the granules to a reduced pressure atmosphere.

14. The method for producing a rare earth sintered magnet according to claim 10, wherein the first and second organic liquids are present in a total amount that is effective to form the granules and, after the second organic liquid has been removed from the granules, the first organic liquid is present in an amount sufficient to maintain the granules without significantly inhibiting orientation of the primary alloy particles by application of a magnetic field.

15. The method for producing a rare earth sintered magnet according to claim 1, wherein:
the size distribution of the granules is adjusted by subjecting the granules to a vibrating body; and then
the granules are charged into the die cavity.

16. The method for producing a rare earth sintered magnet according to claim 15, wherein the vibrating body is a vibrating sieve.

17. The method for producing a rare earth sintered magnet according to claim 15, wherein the primary alloy particles and the organic liquid are charged into a chamber, the primary alloy particles are agglomerated through contact with the organic liquid by rotating a main blade provided in the chamber relative to the chamber, and the resulting agglomerate is loosened by an auxiliary blade provided in the chamber for producing the granules.

18. A method for producing a rare earth sintered magnet, comprising the steps of:
charging a rare earth sintered magnet raw material powder and a granulation aid into a chamber, said granulation aid being free of polymer and comprising at least one member selected from the group consisting of ethanol, toluene, methyl isobutyl ketone, diethylene glycol monoethyl ether, terpene compounds, diethylene glycol monobutyl ether, diethylene glycol monobutyl ether acetate, n-butyl acetate, ethylene glycol monobutyl ether, cyclohexanol, terpineol, pinene, dibutyl ether, xylene, cyclohexanone, propionic anhydride, and menthane;
agglomerating the raw material powder through contact with the granulation aid by rotating a main blade provided in the chamber relative to the chamber, and loosening the resulting agglomerate by contact with an auxiliary blade provided in the chamber for producing the granules;
charging the granules into a die cavity;
obtaining a compacted body by applying a magnetic field to the granules and compressing the granules; and
sintering the compacted body.

19. The method for producing a rare earth sintered magnet according to claim 18, wherein the granulation aid comprises a first organic liquid and a second organic liquid which has a higher saturated vapor pressure than the first organic liquid.

20. The method for producing a rare earth sintered magnet according to claim 19, further comprising the step of, prior to charging the granules into the die cavity, carrying out a treatment for removing the second organic liquid from the granules.

21. The method for producing a rare earth sintered magnet according to claim 20, wherein the first organic liquid, and the second organic liquid are present in a total amount effective to form the resulting agglomerate and, after the treatment for removing the second organic liquid from the granules, the first organic liquid is present in an amount sufficient to maintain the granules without significantly inhibiting orientation of the agglomerated raw material powder.

22. The method for producing a rare earth sintered magnet according to claim 18, wherein the raw material powder has a composition which comprises an $R_2T_{14}B$ phase (wherein R is one or more elements selected from the group consisting of rare earth elements (rare earth elements being a concept which includes Y (yttrium)), and T is one or more elements selected from the group consisting of transition metal elements including Fe or Fe and Co), and mean particle size is between 2.5 and 6 μm.

23. The method for producing a rare earth sintered magnet according to claim 18, wherein the raw material powder is charged into a chamber, and after the main blade has been rotated for a fixed time, the organic liquid is charged into the chamber.

24. The method for producing a rare earth sintered magnet according to claim 18, wherein the size distribution of the granules is adjusted by subjecting the granules to a vibrating body, and then the granules are charged into the die cavity.

25. The method for producing a rare earth sintered magnet according to claim 24, wherein the vibrating body is a vibrating sieve.

* * * * *